United States Patent [19]

Kondo

[11] Patent Number: 5,014,857

[45] Date of Patent: May 14, 1991

[54] DISCRIMINATING APPARATUS FOR PRINTED MATTER

[75] Inventor: Hiroatsu Kondo, Osaka, Japan

[73] Assignee: I.M. Electronics Co., Ltd., Osaka, Japan

[21] Appl. No.: 164,206

[22] Filed: Mar. 4, 1988

[30] Foreign Application Priority Data

Jun. 24, 1987 [JP] Japan ............................ 62-158710

[51] Int. Cl.[5] ........................ B07B 5/34; G06K 9/68; G07D 7/00

[52] U.S. Cl. ................................ 209/534; 194/206; 382/7

[58] Field of Search ...................... 209/534; 194/206; 382/7

[56] References Cited

U.S. PATENT DOCUMENTS

| | | | |
|---|---|---|---|
| 3,180,491 | 4/1965 | Danko | 209/534 |
| 4,041,456 | 8/1977 | Ott et al. | 382/7 |
| 4,348,656 | 9/1982 | Gorgone et al. | 209/534 X |
| 4,349,111 | 9/1982 | Shah et al. | 209/534 |
| 4,442,541 | 4/1984 | Finkel et al. | 209/534 X |
| 4,464,787 | 8/1984 | Fish et al. | 382/7 |
| 4,542,829 | 9/1985 | Emery et al. | 209/534 |
| 4,547,899 | 10/1985 | Nally et al. | 382/7 |
| 4,628,194 | 12/1986 | Dobbins et al. | 209/534 X |
| 4,807,736 | 2/1989 | Kondo et al. | 194/206 |
| 4,834,230 | 5/1989 | Kondo et al. | 209/534 X |

FOREIGN PATENT DOCUMENTS 61-177592 8/1986 Japan .

*Primary Examiner*—Johnny D. Cherry
*Assistant Examiner*—Edward M. Wacyra

[57] ABSTRACT

An apparatus for discriminating a printed matter having a discriminating pattern printed thereon, including: a sensor for scanning the printed matter and producing an analog signal corresponding to the discriminating pattern thereof. A timing device is provided for generating periodical timing signals in proportion to the transferring speed of the printed matter. An analog-digital converting device is provided for sampling the analog signal in accordance with the timing signals, and producing a series of digital sampled data. A reference data memorizing device is stored therein with at least one reference to be compared with the series of sampled data, and a control system which shifts each reference data in address a plurality of times relative to the series of sampled data, checking if the amplitudes shown by the sampled data are within the allowable limits shown by the the reference data, and determining from the results of the checks the coincidence or noncoincidence between the series of sampled data and the reference.

7 Claims, 19 Drawing Sheets

FIG.18
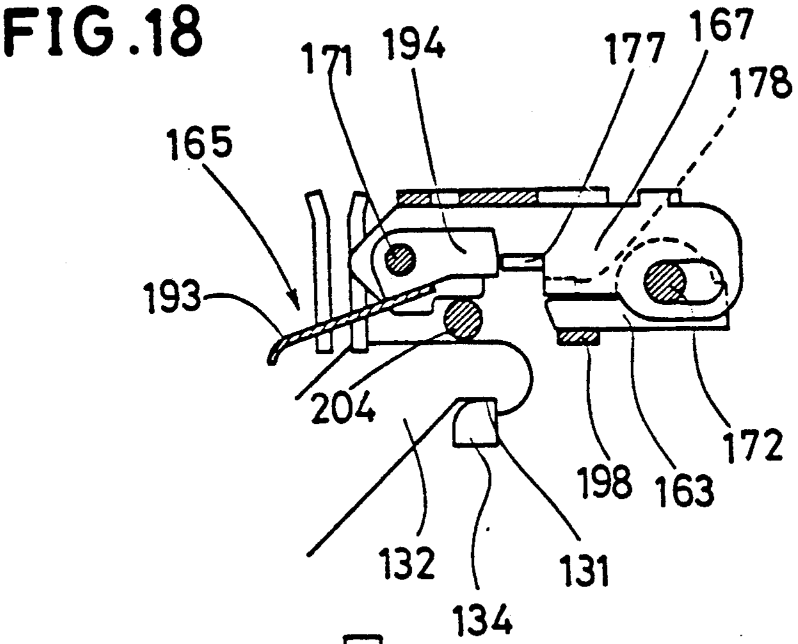
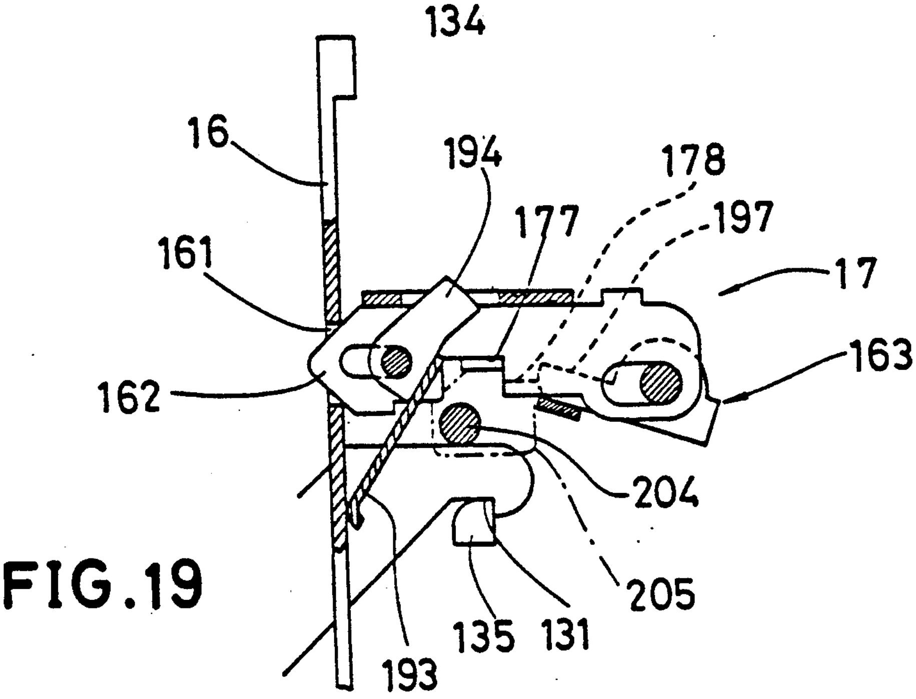
FIG.19

DISCRIMINATING APPARATUS FOR PRINTED MATTER

BACKGROUND OF THE INVENTION

The present invention relates to an apparatus for discriminating printed matter such as bank notes or the like, and more particularly to an apparatus for distinguishing the genuineness from the spuriousness of printed matter or for discriminating the kind or sort of printed matter, for example, the denominations of bank notes.

The Japanese Patent publication TOKKAI No. 177592/86 discloses a method for discriminating printed matter, in which the analog output of a magnetic sensor and reference data are compared with each other while being relatively shifted in their addresses, to thereby discriminate printed matter. However, this method identifies the coincidence or noncoincidence of a series of sampled data with the reference data, which sampled data is formed by standardizing the analog output of the magnetic sensor with a fixed level of threshold. This is nothing but the comparison of the pulse width between the sampled data and the reference data, and makes no effective use of individual or minute pulse amplitude data. Therefore, such a disadvantage of the prior art cited in the foregoing occasionally hinders a higher improvement in the discriminating accuracy.

It is therefore, an object of the present invention to provide an apparatus for discriminating printed matter which is capable of achieving a much higher improvement in the discriminating accuracy by using the basic operation thereof in which the analog signal from the magnetic sensor is converted into digital data each informing the amplitude thereof, with an A-D converter means, and the digital data are compared with the reference data to check if the amplitude of the analog signal is within the allowable limit while being shifted in their addresses.

SUMMARY OF THE INVENTION

According to one aspect of the invention, the apparatus for discriminating a printed matter having a discriminating pattern printed thereon, comprises:

a passage with an inserting port for the printed matter;

a transferring means for transferring the printed matter inserted in said inserting port;

a sensor means including at least one sensor for scanning the printed matter while transferring and produces an analog signal corresponding to the discriminating pattern thereof;

a timing means for generating periodical timing signals in proportion to the transferring speed of the transferring means so that the timing signals correspond to positions at regular short intervals on the printed matter;

an analog-digital converting means for sampling the analog signal in accordance with the timing signals, and producing a series of digital sampled data each designating the amplitude of the analog signal;

a reference data memorizing means stored therein with at least one reference to be compared with a series of sampled data, said reference comprising a plurality of reference data showing allowable limits for the amplitude of the analog signal corresponding predetermined positions on the printed matter; and a control means including means for:

shifting each reference data address a plurality of times relative to said a series of sampled data by incrementing or decrementing the address for a condition wherein an address base of the reference data and an address base of the sampled data correspond to each other, and also conditions wherein the address base of the reference data are shifted to either side of the address base of the sampled data, wherein said address base corresponds to a predetermined reference position on the printed matter;

checking at each of said conditions if the amplitudes shown by the sampled data are within said allowable limits shown by the the reference data; and determining from the results of the checks at plural times the coincidence or noncoincidence between said a series of sampled data and the reference.

BRIEF DESCRIPTION OF THE DRAWINGS

FIGS. 16 to 19 are diagrams showing the operation of the locking means;

DETAILED DESCRIPTION OF THE INVENTION

A preferred embodiment of the present invention will now be described with reference to the accompanying drawings, and this embodiment is formed as a unit available for discriminating and stacking bank notes, which is incorporated in an automatic vending machine or any other similar machine.

In the figures, the apparatus 1 comprises a passage 7 with an inserting port 15 for printed matter B, transferring means 19 for transferring the printed matter B inserted in said inserting port 15, sensor means including at least one sensor SM for scanning the printed matter B while transferring and producing an analog signal corresponding to the discriminating pattern thereof, timing means E for generating periodical timing signals in proportion to the transferring speed of the transferring means 19 so that the timing signals correspond to positions at regular short intervals on the printed matter B, analog-digital converting means for sampling the analog signal in accordance with the timing signals, and producing a series of digital sampled data each designating the amplitude of the analog signal, reference data memorizing means stored therein with at least one reference R to be compared with said series of sampled data, said reference R comprising a plurality of reference data showing allowable limits AL for the amplitude AM of the analog signal corresponding to predetermined positions on the printed matter, and a control means including means for, shifting each reference data in address AD a plurality of times relative to said series of sampled data by incrementing or decrementing the address AD for a condition wherein an address base of the reference data and an address base of the sampled data correspond to each other, and also conditions wherein the address base of the reference data are shifted to either side of the address base of the sampled data, wherein said address base corresponds to a predetermined reference position on the printed matter, checking at each of said conditions if the amplitudes AM shown by the sampled data are within said allowable limits AL shown by the reference data, determining from the results of the checks at plural times the coincidence or noncoincidence between said series of sampled data and the reference R.

(A) Description of a Main Body 4 of the Apparatus 1

Figure 1:
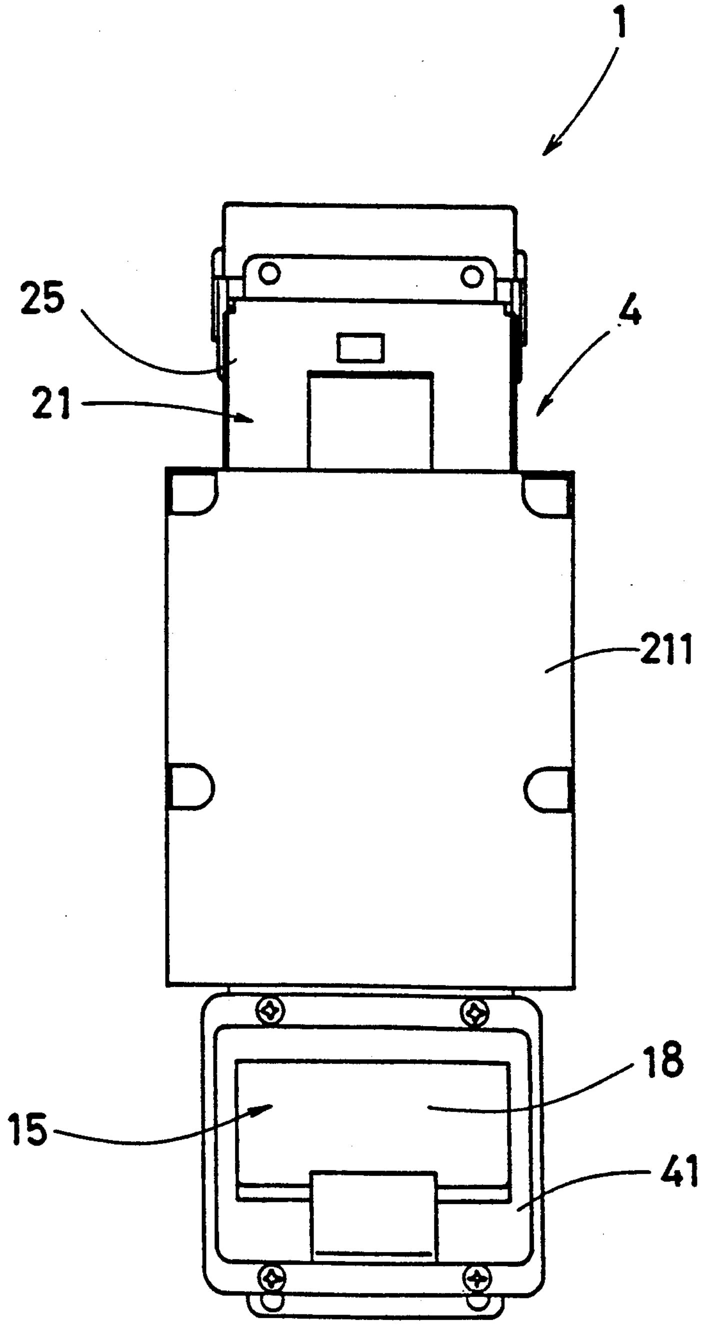
FIG. 1 is a front view showing a preferred embodiment of the present invention.
Figure 2:
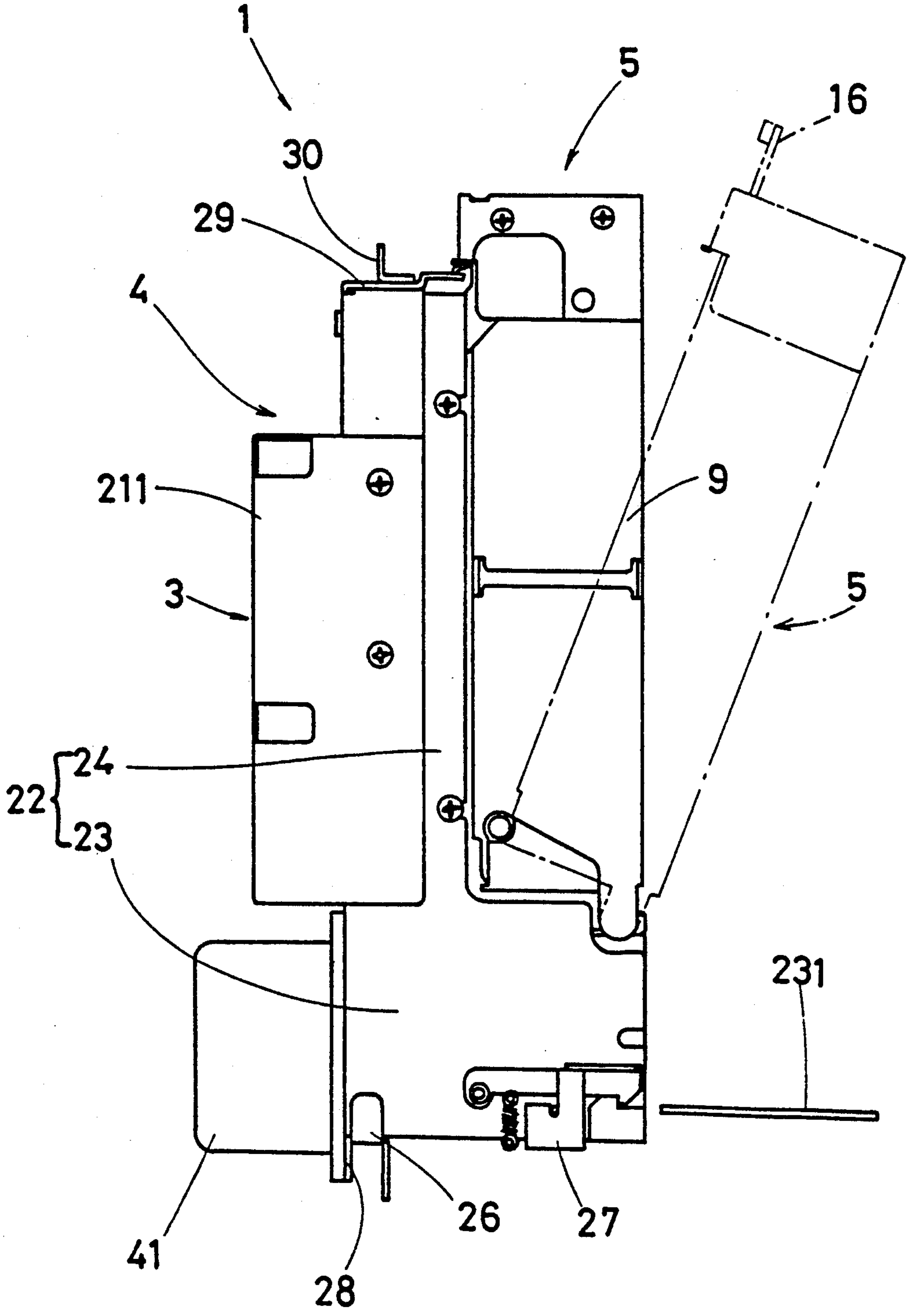
FIG. 2 is a right side view of FIG. 1.
Figure 3:
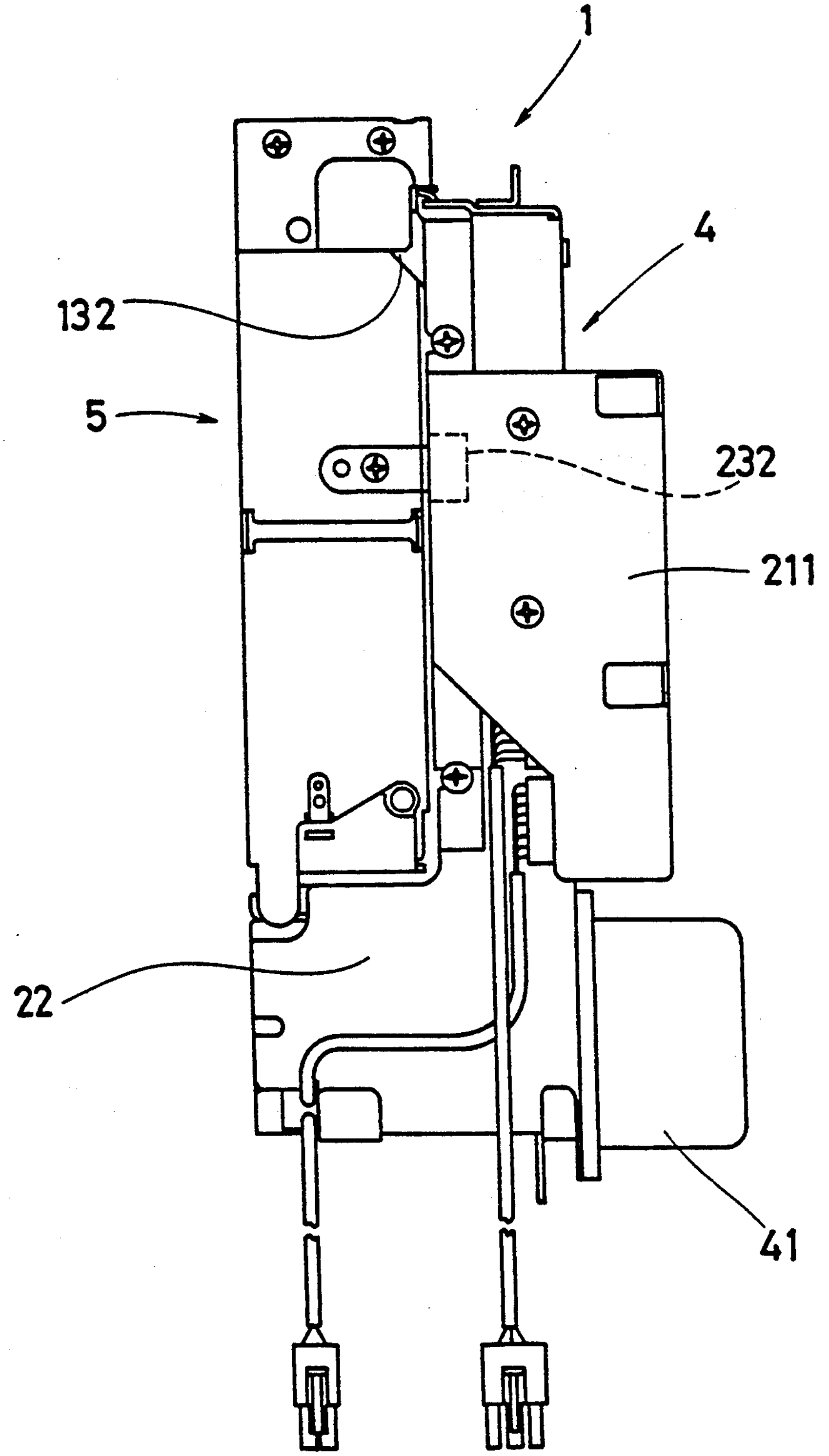
FIG. 3 is a left side view of FIG. 1.
Figure 4:
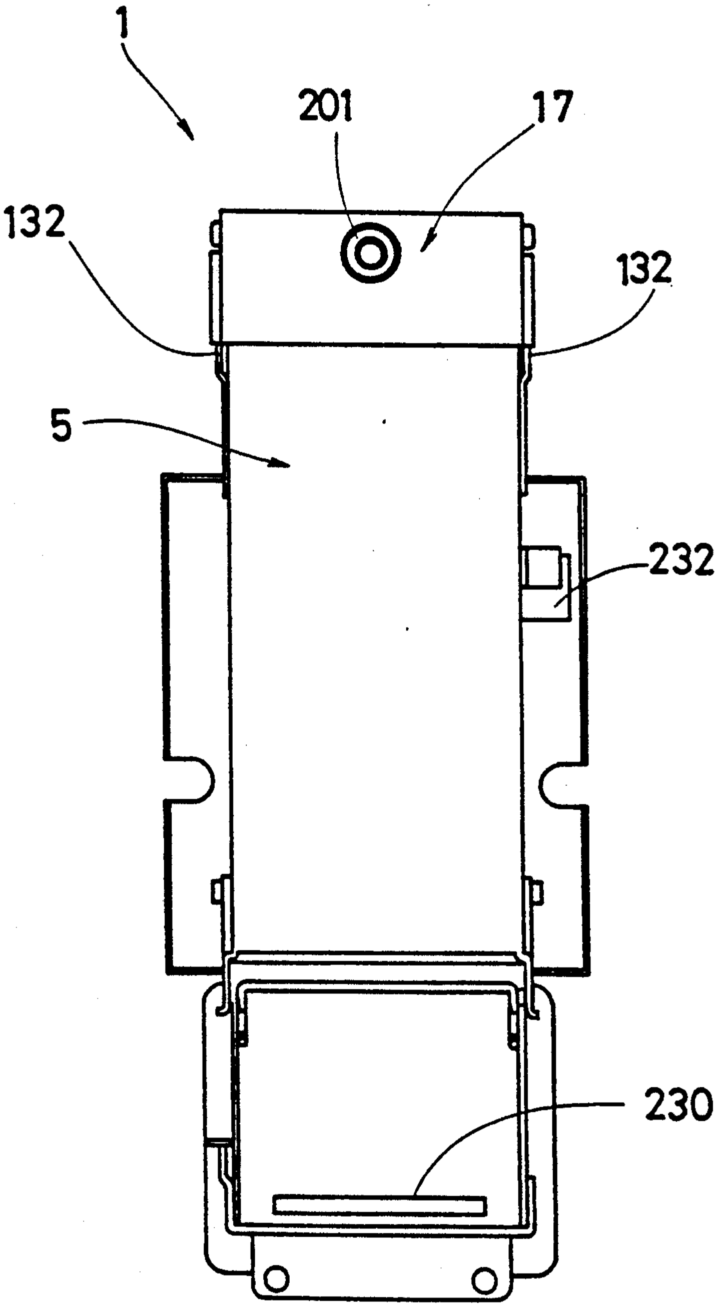
FIG. 4 is a rear view of FIG. 1.

The main body 4 is provided with a basic frame 21 and an inside frame 32. As shown in FIGS. 1 to 3, the basic frame 21 includes side plates 22, 22 respectively including a lower plate portion 23 and a narrow upper plate portion 24 located in the middle of the lower plate portion 23, thereby forming a reversely T-shaped configuration as a whole. The basic frame also includes a front plate 25 joined to the front end of each upper plate portion 24, and an upper plate 29 formed on the upper end of the front plate 25 by bending the front plate 25.

Also, the side plates 22 have connecting pieces 26 and 27 stretched across their lower ends. The connecting piece 26 is provided with mounting pieces 28, 28 in the underside thereof, and the upper plate 29 is uprightly fitted with an attaching member 30 to the main body.

The lower end portion of the basic frame 21 has a front cover 41 fixed on the lower end portion thereof, and this front cover is in the configuration of a square-shaped tube surrounding the front end portion of the above mentioned lower plate portion 23. The fixation of the front cover 41 on the basic frame 21 is achieved by screwing to the above mentioned mounting pieces 28 and the front surface of the front plate 25 flanges formed on the rear end of the front cover 41.

An opening at the front of the front cover 41 forms the inserting port 15 into which the printed matter B is inserted, and is provided with a gate 18 which can be swung upwards to open the inserting port 15.

Figure 5:
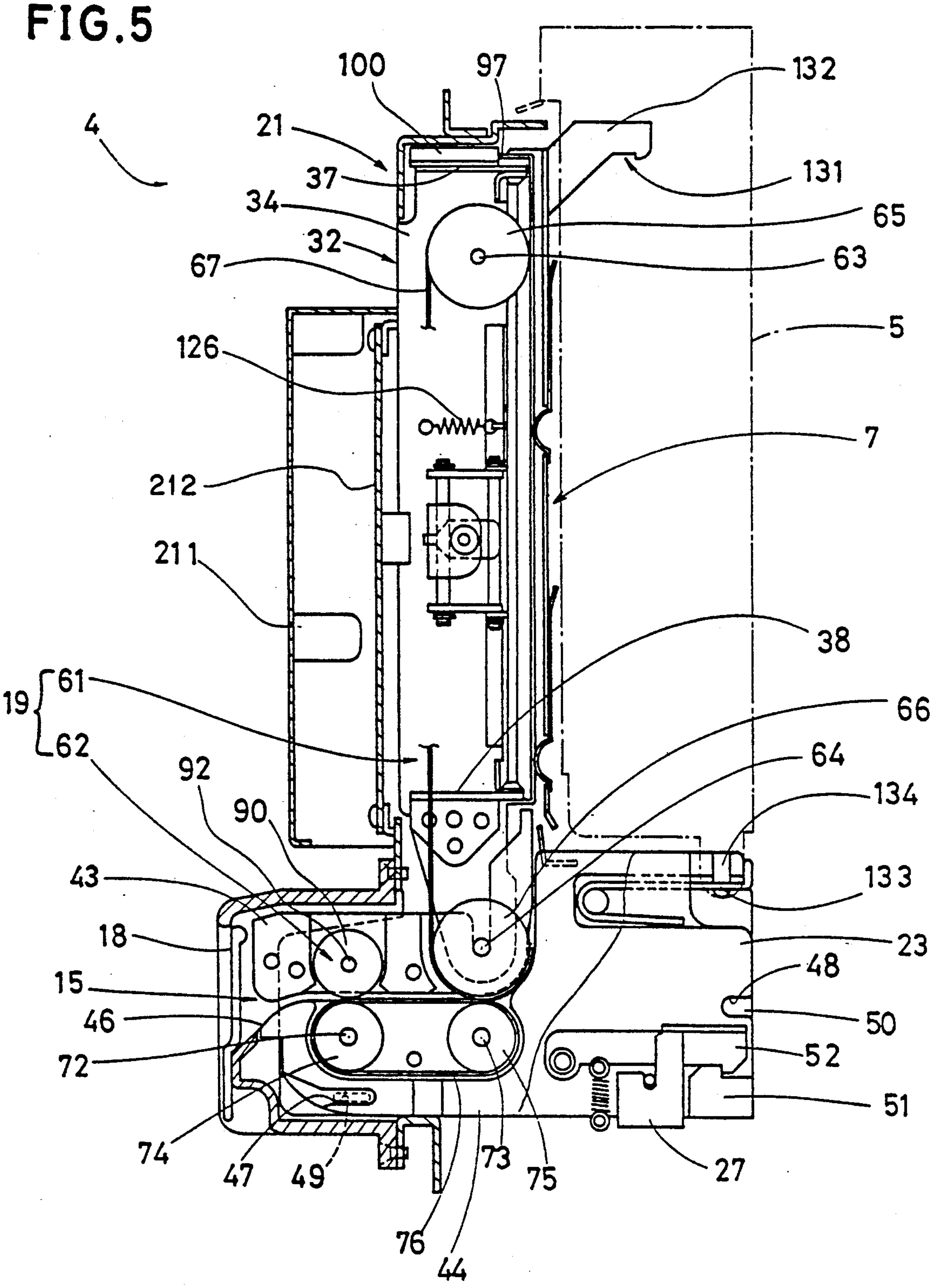
FIGS. 5 and 6 are longitudinal sectional views of FIG 1.
Figure 6:
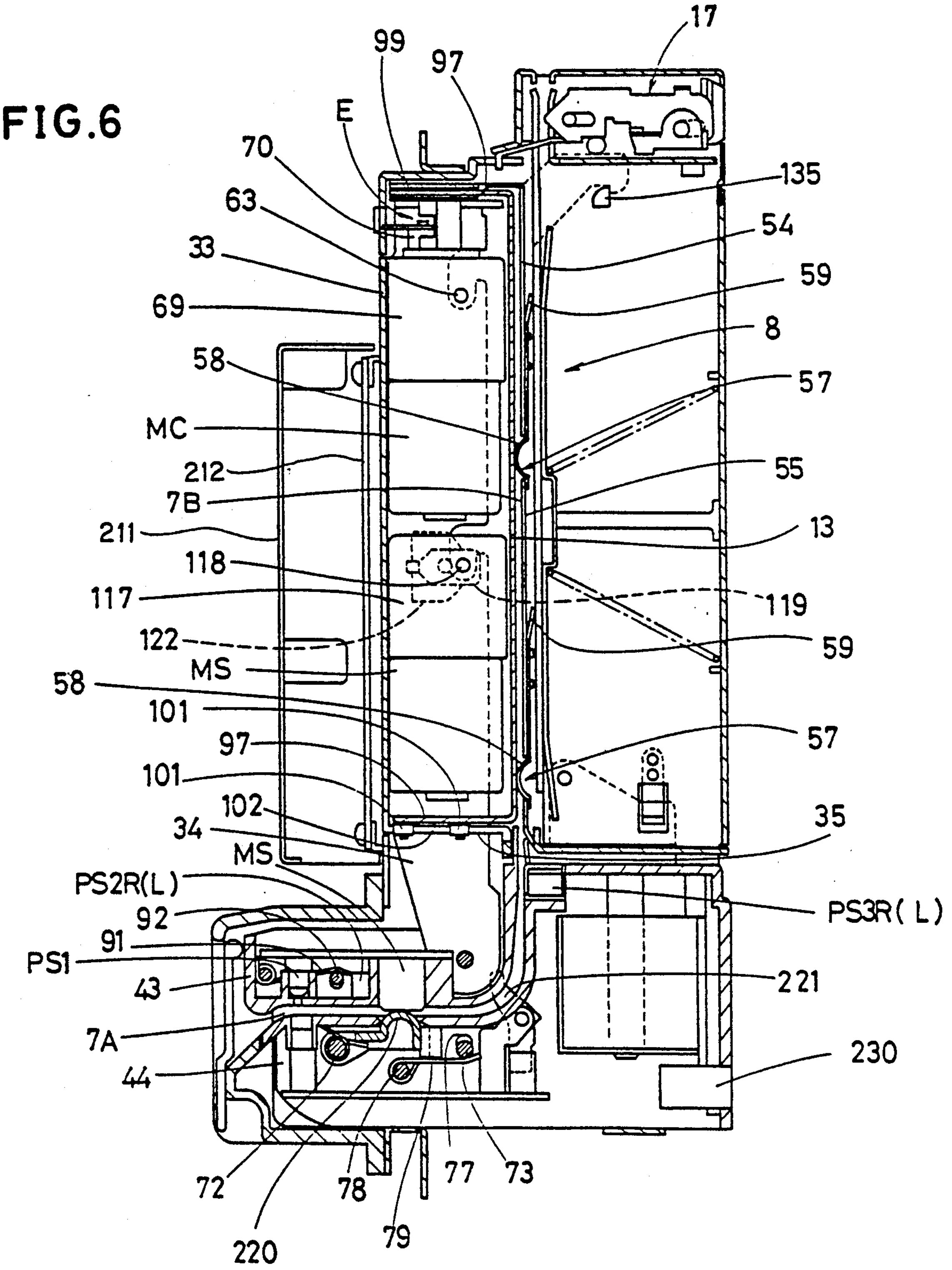
Figure 7:
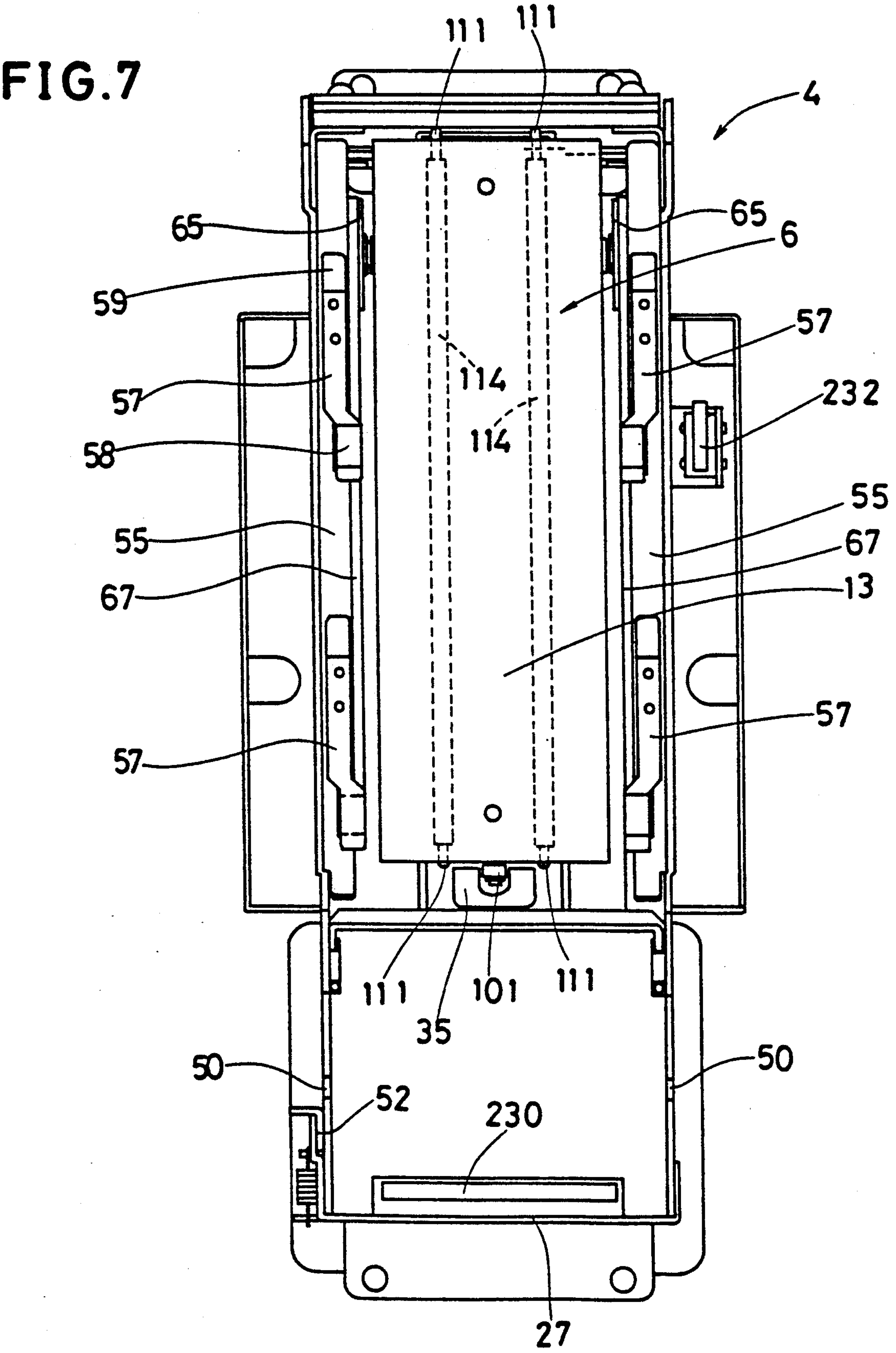
FIG. 7 is a rear view of the main body.
Figure 8:
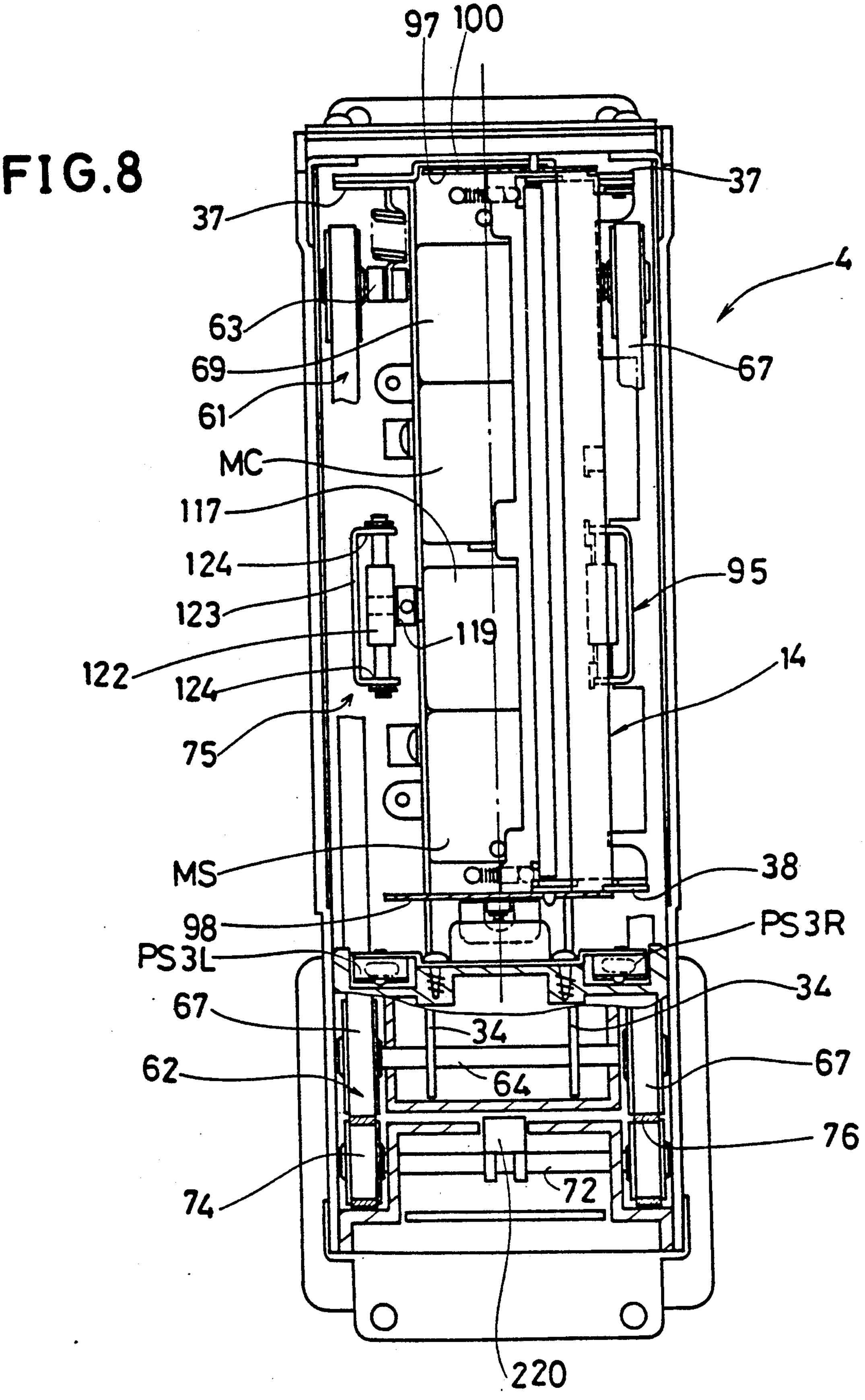
FIG. 8 is a sectional view of FIG. 7.

Also, the above mentioned basic frame 21 is fitted with an upper block piece 43 and a lower block piece 44 between the lower plate portion 23, 23 as shown in FIGS. 5 and 6. Both block pieces are hollow in their interiors.

The lower block piece 44 is provided with a protrusion in the rear edge of the base thereof which has substantially the same depth as the above mentioned lower plate portion 23, and the lower block piece has an L-shaped side configuration. The front end portion of the base is inserted into the front cover 41, and the upper surface of the base is formed with a smooth surface of a circular arc in shape in the horizontal rear end thereof, which is adjacent to the vertical front of the protrusion. Moreover, the front end of the upper surface of the base has a guide portion 46 formed thereon, which is comprised of a downward slope. Also, the lower block piece 44 is formed with a groove 47 and a projection 50 in the front edge and the rear edge of each side thereof respectively. On the other hand, the above mentioned side plate 22 is provided with a prominence 49 on the inner surface thereof and a groove 48 in the rear edge thereof. The prominence 49 and the projection 50 are respectively engaged with the grooves 47 and 48, whereby the lower block piece 44 is detachably mounted in the rear direction. Furthermore, the lower block piece 44 is provided with an L-shaped engaging portion 51 in each side thereof, and this engaging portion is interlocked with a hook 52 which is attached to the side plate 22 and is furnished with a spring force, thereby allowing the lower block piece to be fixed on the basic frame 21.

The upper block piece 43 is arranged over the lower block piece 44 with a substantially fixed spacing.

The above mentioned inside frame 32 includes a front plate 33 fixed to the above mentioned front plate 25, side plate 34, 34 and a lower plate 35, and the lower ends of the side plates 34, 34 are inserted into the rear end portion of the above mentioned upper block piece 43.

The main body 4 is provided with an interlocking member 131 to attach the stacker box 5 thereto.

In this embodiment of the invention, the interlocking member 131 includes a hook 132 protruding from the upper end portions of the side plates 22, 22 of the basic frame 21 in the rear direction, is formed in a configuration having a circular arc in the rear edge thereof, and is notched in an L-shaped configuration in the underside thereof. The upper corner section of the rear end of the lower plate portion 23 of the side plate 22 is notched in an L-shaped configuration, and the side of the lower block piece 44 which has been consequently revealed outside is provided with interlocking grooves 134, 134 having a receiving piece 133 disposed therein. The receiving piece extends vertically, and is set free in the upper end thereof, and also includes a spring material in the lower end thereof.

(B) Description of the Transferring Means 19

The main body 4 is provided with the transferring means 19 which is capable of transferring the printed matter B in an unfolded state thereof to the takeout portion of the passage 7 while supporting from the front and rear sides thereof both side edges of the printed matter B inserted in an unfolded state thereof into the inserting port 15.

The transferring means 19 in this embodiment includes a first transferring means 61 which is arranged in the foregoing inside frame 31, and is operated by a transferring motor MC, and a second transferring means 62 which is arranged in the foregoing upper and lower block pieces 43 and 44, and is driven by the foregoing first transferring means 61.

In this embodiment, the first transferring means 61 includes a pair of belt conveyors in which endless belts 67, 67 comprising timing belts are stretched around and between rotors 65 and 66 attached to both ends of supporting shafts 63 and 64 extending through the upper and lower end portions of the side plate 34. the supporting shaft 63 forms a gear unit 69 together with a worm wheel, a worm gear or the like, and is subjected to decelerated rotation by using the rotating operation of the transferring motor MC. Therefore, the rear side of each endless belt moves upwardly and downwardly according to the regular and reverse rotation of the transferring means MC.

A rotary encoder E is attached to a rotating shaft 70 which overhangs the upper end of the foregoing gear unit 69, and has synchronous rotation with the supporting shaft 63, namely, the transferring velocity of the transferring means 19.

The second transferring means 62 includes a pair of belt conveyors in which endless belts 76, 76 comprising timing belts are stretched around and between rotors 74, 75 fitted to both ends of front and rear supporting shafts 72, 73 extending through the base of the lower block piece 44.

The above mentioned rear supporting shaft 73 is supported so as to be capable of vertical movement by using a vertically extending elongated hole 77 made in the side plate of the lower block piece 44, and the supporting shaft 73 is furnished with upward force by a spring 79 arranged on both ends of a supporting pin 78 stretched between the above mentioned side plates in the middle of the distance between the supporting shafts 72 and 73. Therefore, the rotors 75 and 75 are respectively furnished with upward force.

Also, receiving rollers 90, 90 are provided on the upside of the rotors 74 and 74. The receiving rollers 90, 90 are fixed on both ends of a supporting shaft 92 which extends through an elongated hole in the front end portion of the upper block piece 43, and also, is furnished with downward force by means of a spring 91.

The upside of the endless belt 76 comes into contact with the underside of the receiving roller 90 and that of the endless belts 67 of the first transferring means 61.

(C) Description of the Passage 7

The above mentioned passage 7 comprises a lower passage 7A and an upper passage 7B.

The lower passage 7A is formed by a clearance between the above mentioned upper block piece 43 and the lower block piece 44, and leads to the above mentioned inserting port 15 into which the printed matter B is inserted. Therefore, the lower passage 7A is provided with the guide portion 46, the horizontal portion, the portion of a circular arc in shape, and the vertical portion in order from the front, and feeds the horizontally inserted printed matter B upwardly.

Also, the upper passage 7B is formed in the rear of the above mentioned basic frame 21 between the above mentioned endless belt 67 and guides 54, 54.

Each guide 54 is formed with a guide piece 55 in the rear end of the mounting piece thereof which is fixed on the rear edge of the upper plate 24 of each side plate 22. This guide piece 55 projects inwardly, and is opposed to the above mentioned endless belt 67. As a result, the guide 54 is L-shaped in the sectional configuration thereof. Also, the guide 54 is fitted with holders 57, 57 in the substantially middle portion and lower end portion thereof.

The holder 57 is formed of a plate spring, and is provided with a projection 58 of a circular arc in shape which protrudes frontwards from a notch of the above mentioned guide piece 55, and with a keeper 59 projecting diagonally rearwards. Also, the above mentioned guide piece 55, 55 guide both side portions of the printed matter B, and supports the printed matter B vertically between the endless belt 67 and said guide pieces, while at the same time, the projections 58, 58 of the holder 57 force the printed matter B against the rear working side of the above mentioned endless belt.

The above mentioned takeout portion 8 of the passage 7 is defined between the inside ends of the guide pieces 55, 55 and is formed so as to be smaller in width than the printed matter B, whereby the printed matter B is exposed in the middle portion thereof to the outside of the main body 4.

The passage 7 is provided with a lever 221 to prevent any pilferage of a bank note deep within the passage.

(D) Description of the Forcing Means 6

The takeout portion 8 of the passage 7 is also provided with the forcing means 6.

Figure 9:
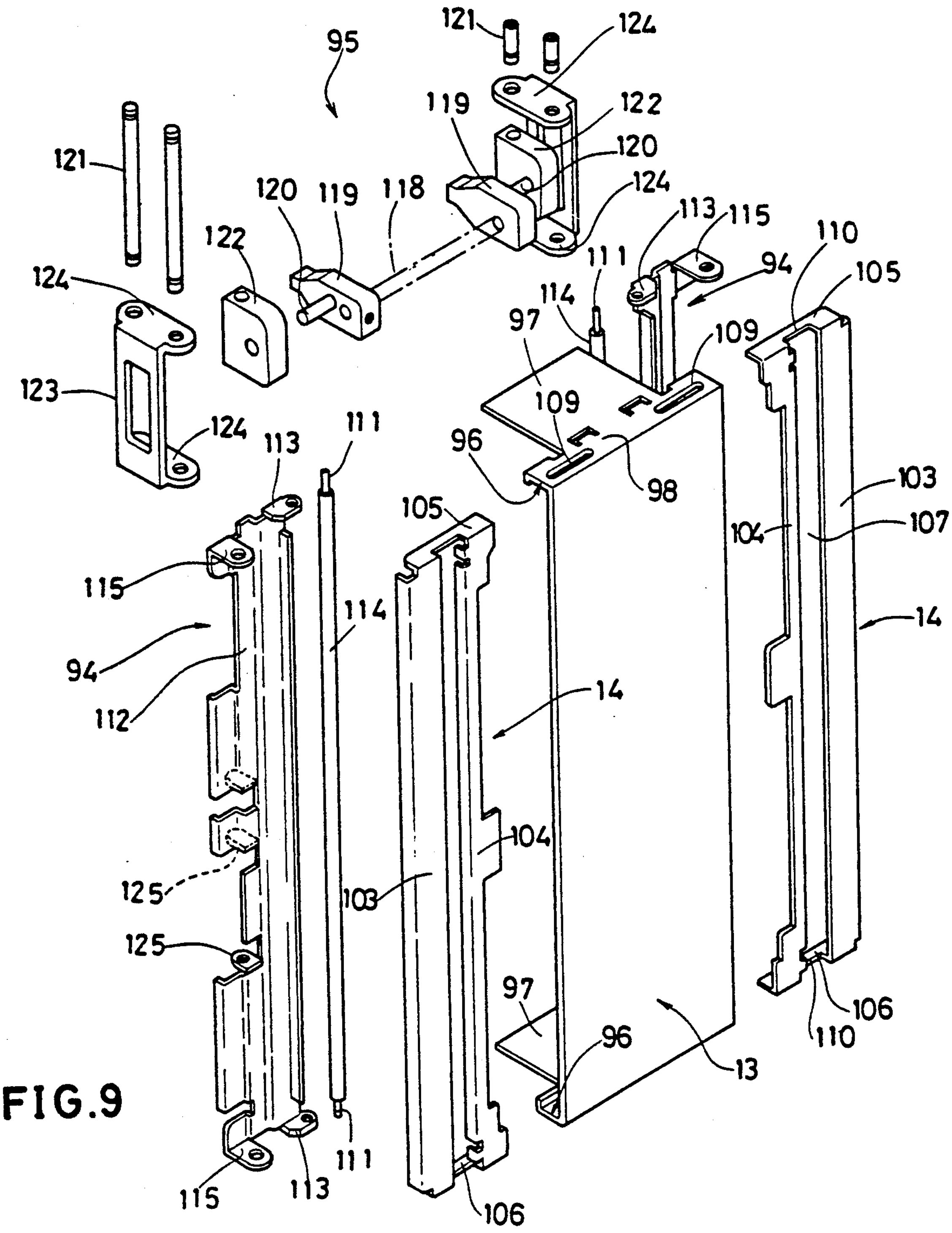
FIG. 9 is an exploded perspective view of the forcing means.
Figure 10:
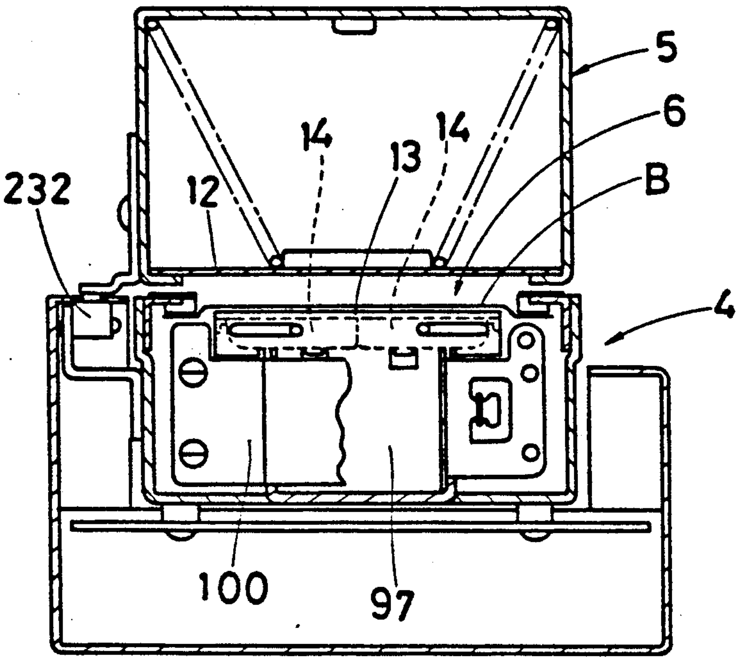
FIGS. 10 and 11 are cross sectional views of the main body.
Figure 11:
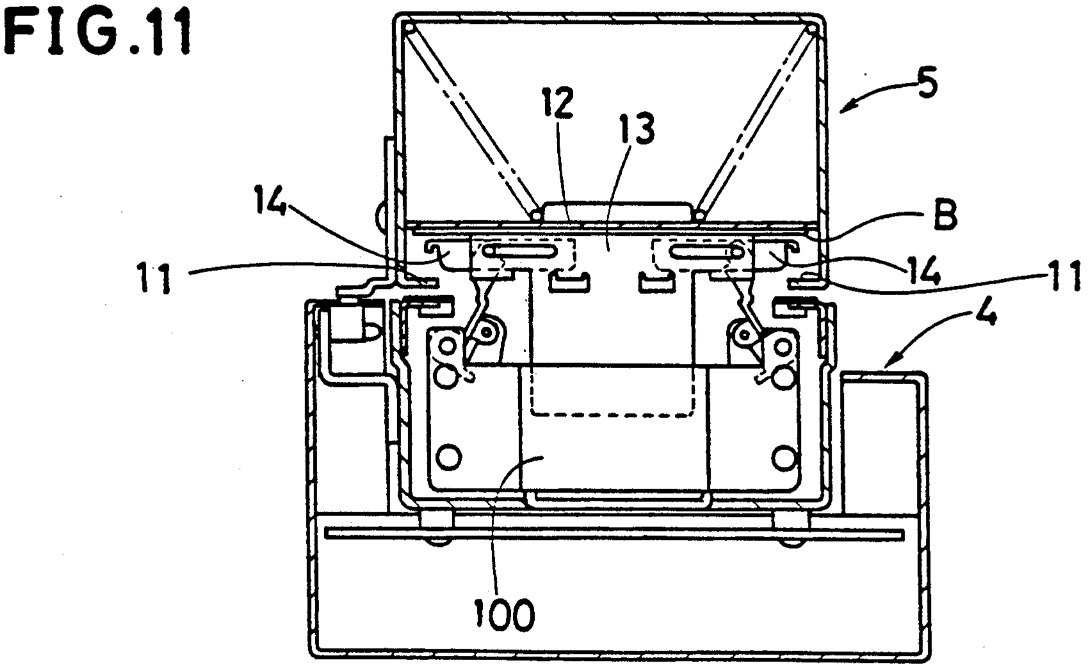

As shown in FIG. 9, the forcing means 6 includes a forcing plate 13 and a pair of unfolding plates 14 and also, as far as this embodiment is concerned, a pair of swinging arms 94, 94 which transversely reciprocate the forcing plate 13 and also horizontally opens the unfolding plates 14, 14.

The forcing plate 13 includes a master plate which has substantially the same length as and smaller width than the printed matter B, and the upper and lower ends of the forcing plate is bent in an angularly C-shaped configuration to thereby form slide grooves 96, 96 which extend horizontally, and at the same time, oppose each other in the top and bottom of the master plate. Moreover, the forcing plate is formed with guide plates 97, 97 in the middle portions of top and bottom bent pieces 98, 98 thereof, which guide plates extend in front and in parallel with each other.

Also, as shown in FIG. 6, the top guide plate 97 is inserted in a guide groove 99 extending transversely of a guide 100 of a downward C shape in section which is stretched between the upper ends of the side plates 34, 34 of the above mentioned side plate 32, and moreover, guide rollers 101, 101 under the lower guide plate 97 are fitted into an elongated hole made through the middle portion of the lower plate 35 of the inside frame 32, thereby allowing the forcing plate 13 to slide in the front or in the rear without any slant thereof.

The unfolding plate 14 connects an outer piece 103 thereof and an inner piece 104 with a spacing 107 therebetween by using a top piece 105 thereof and a bottom piece 106 thereof, the top piece 105 and the bottom piece 106 being respectively inserted in the upper and lower end slide grooves 96, 96 of the above mentioned forcing plate 13. This allows the unfolding plate 14 to be attached to the front surface of the master plate of the forcing plate 13 so as to be capable of horizontal sliding movement.

The above mentioned bent pieces 98, 98 of the forcing plate 13 are provided with horizontally elongated holes 109, and the top piece 105 and the bottom piece 106 of the unfolding plate 14 are furnished with elongated holes 110 of a reversed C shape in configuration. The elongated holes 109 and 110 are respectively aligned with each other, and engaged with pins 110 which project from the inside ends of the swinging arms 94 described hereinafter.

Each swinging arm 94 is provided on the rear thereof with projecting pieces 115, 115 in the outer end of a basic element 112 thereof which includes a folded piece of a cranked shape in section, and said projecting pieces 115, 115 are pinned to bearing pieces 37 and 38 provided on the upper and the lower portion of the side plate 34 of the above mentioned inside frame 32. Also, the basic element 112 is formed with receiving pieces 113, 113 in the inside ends thereof, and a roller 114 is pivotally mounted between these receiving pieces 113 and 113 by means of the above mentioned pins 111 and 111 projecting upwardly or downwardly. Also, a spring 126 is stretched between the basic element 112 and the pin protruding from the front edge portion of the side plate 34 to furnish the roller with frontward force.

The swinging arms 94 are swung by means of swinging means 95.

Figure 12A:
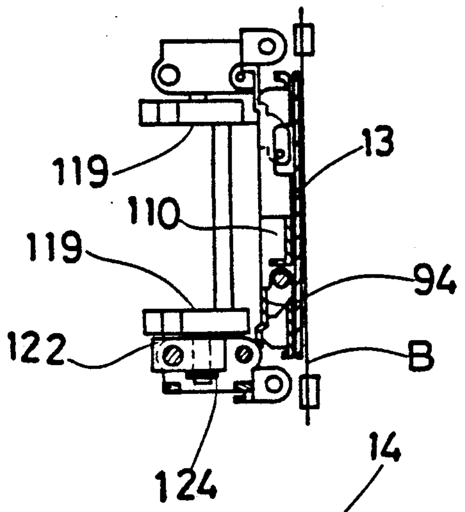
FIGS. 12A to 12C are diagrams showing the operation of the forcing means.
Figure 12B:
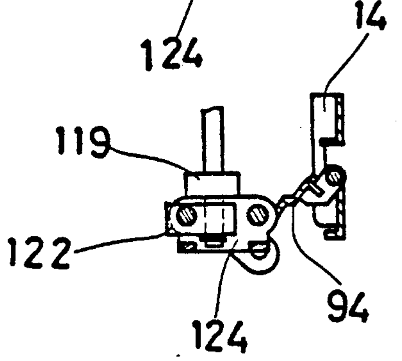
Figure 12C:
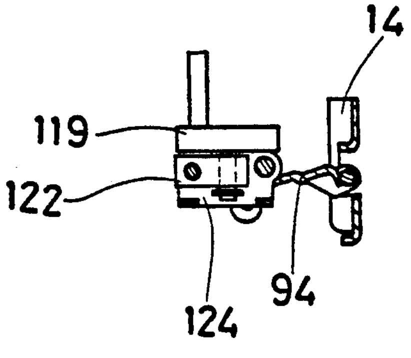

The swinging means 95 includes a stacker motor MS, a gear unit 117 of a similar kind to the above mentioned gear unit 69, having an output shaft 118 which protrudes on both sides thereof, a pair of cam pieces 119 and 119 each fixed on each end of the output shaft 118, and each cam piece provided with a pin 120 protruding eccentrically from the abovementioned output shaft 118 in each side, slide pieces 112 each pivoted to each cam piece, slide shafts 121 each vertically loose-fitted through each slide piece 112, and link members comprising a pair of link pieces 124, 124 connected with each other through a joining piece 123, and connecting the top and bottom ends of said slide shaft 121 with supporting pieces 125, 125 which protrude from the front surface of the basic element 112 of the above mentioned swinging arm 94. As a result, as shown in FIGS. 12A to 12C, the rotation of the cam pieces 119 allows the slide pieces 122 to have circular motion, thereby achieveing the swinging movement of the swinging arms through the link pieces 124. Also, the swinging arms 94 are turned about the pivoting point thereof located adjacent to and in front of both side ends of the takeout portion 8, and the rotation of the inside ends of the swinging arms 94 are concomitantly allowed to reach the rear from the front of the passage 7 through the takeout portion 8.

As is apparent from the foregoing description, the motion of each swinging arm 94 which is horizontally reciprocated in the inside end thereof allows the forcing plate 13 to traverse the passage 7 rearward from the front, and as a result, the forcing means 6 forces the middle portion of the printed matter B against the receiving plate of the stacker box 5 described hereinafter. Also, each unfolding plate 14 projects to each side from both side portions of the forcing plate 13 within the stacker box 5 to force both sides of the printed matter B so that these sides are unfolded. The returning motion of the swinging arm 94 causes the unfolding plates 14, 14 to retreat by using the spring stretched between the unfolding plates, and consequently, the forcing plate 13 also retreats. Therefore, the forcing means 6 is capable of stacking the printed matter B without folding it within the stacker box 5.

(E) Description of the Stacker Box 5

The stacker box 5 is provided with the receiving plate 12 within the master box 9 which is provided with the opening 10 in the front thereof.

In the master box 9, an upper plate 139 and an openable lower plate 140 are attached to an angularly C-shaped frame provided with a rear plate 137 and side plates 138, 138.

The rear plate 137 is a plain rectangular body in shape which is larger in size than the printed matter B, and this plate is provided with a U-shaped notch in the lower edge thereof to hold the stack of printed matter B by finger.

Each side plate 138 is provided in its front edge with front piece 141 of narrow width such that the front pieces are inwardly opposed to each other, and further provided in the lower edge thereof with a projecting piece 143 which is internally fitted with a protruding interlocking pin 142 which is inserted into the above mentioned interlocking groove 134.

The above mentioned supporting members 11 are, in this embodiment, formed by the above mentioned thin front pieces 141, 141.

The receiving plate 12 includes a plain rectangular-shaped body, and the protruding pieces provided on both side edges of the main body are inserted in guide grooves 145, 145 which extend transversely in the middle portions of the side plates 138, 138, whereby the receiving plate 12 is mounted on the master box 9 so as to allow the receiving plate to have transverse motion thereof. Also, the receiving plate 12 is furnished with force in the direction of the above mentioned supporting members 11 by means of a spring 146 located between the receiving plate and the above mentioned rear plate 137. The receiving plate 12 is also provided with a U-shaped notch in the lower edge thereof.

The bottom plate 140 is allowed to be openably attached to the master box 9 by pinning to the above mentioned side plates 138 the upper front end portions of side pieces 148, 148 erected uprightly on both side edges of the bottom plate 140 along each outer surface of the above mentioned side plates 138, 138, while at the same time, an outward projection of a locking piece 149 of a plate spring, attached to the side plate 138 is engaged with an opening made in the inside surface of the rear end portion of the side plate 138, whereby the bottom plate 140 is locked to prevent the opening thereof.

The upper plate 139 is stretched between the upper end portions of the side plates 138, as shown in FIG. 6.

Therefore, the master box 9 is capable of holding the printed matter B between the receiving plate 12 and the supporting members 11 and containing the stack of printed matter therein. Also, the master box 9 can be inserted between the above mentioned hooks 132 by putting the interlocking pin 142 into the interlocking groove 134 and slanting the master box 9 in front. As a result, locking members 135 including projections of sector in shape, each of which is formed on each side of the master box 9 is mated with the interlocking member 131 of the hook 132 to thereby allow the master box 9 to be mounted on the main body 4. If the master box 9 is depressed against the receiving piece 133, and is brought down in the rear, the master box can be removed from the main body. The attachment of the master box 9 to the main body allows the above mentioned opening 10 to surround the takeout portion 8 of the passage 7.

(F) Description of Cover Plate 16 and Locking Means 17

The opening 10 of the stacker box 5 is closed by a cover plate 16, and the cover plate 16 is locked in a closed state by using a locking means 17.

Figure 13:
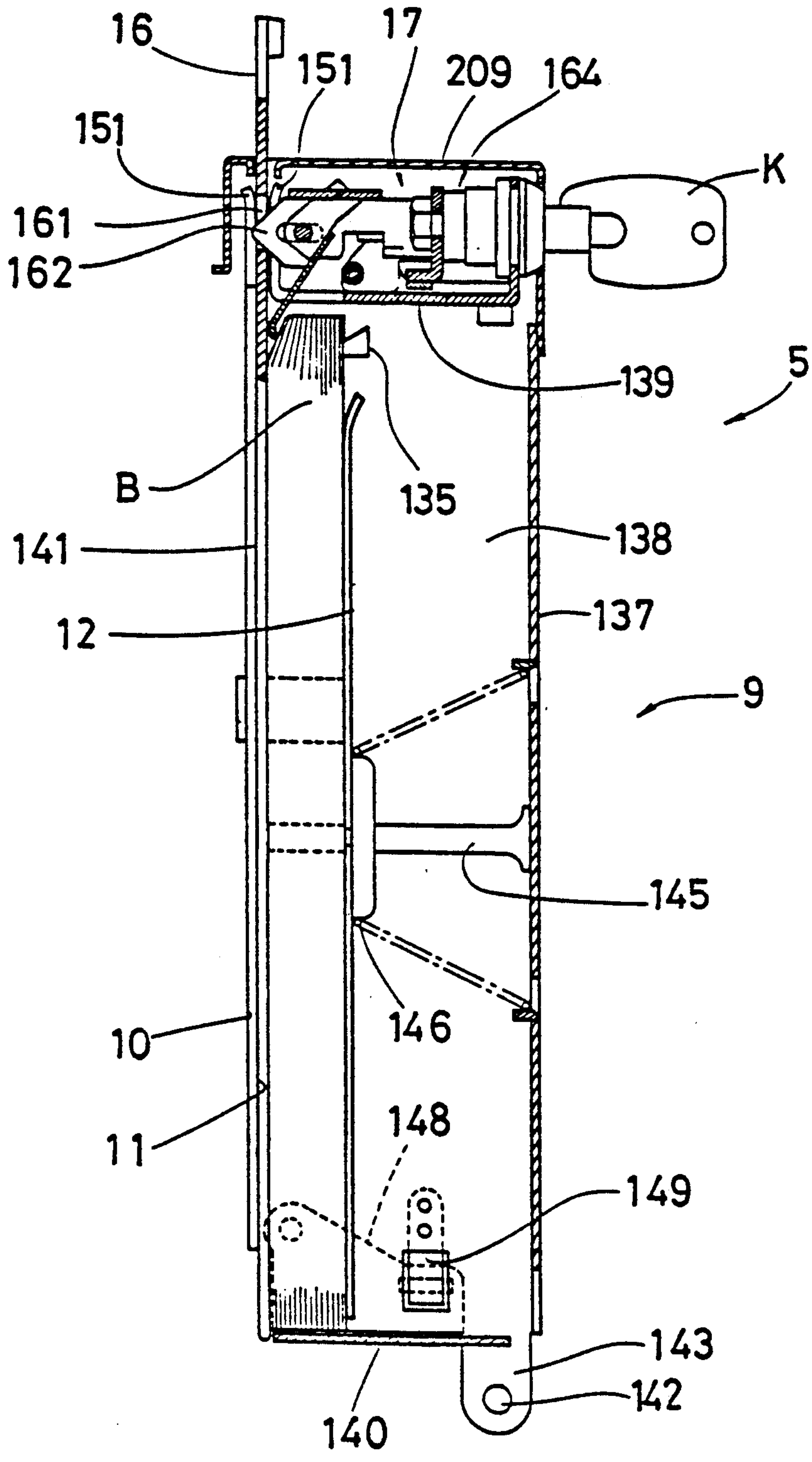
FIG. 13 is a longitudinal sectional view of the stacker box.
Figure 14:
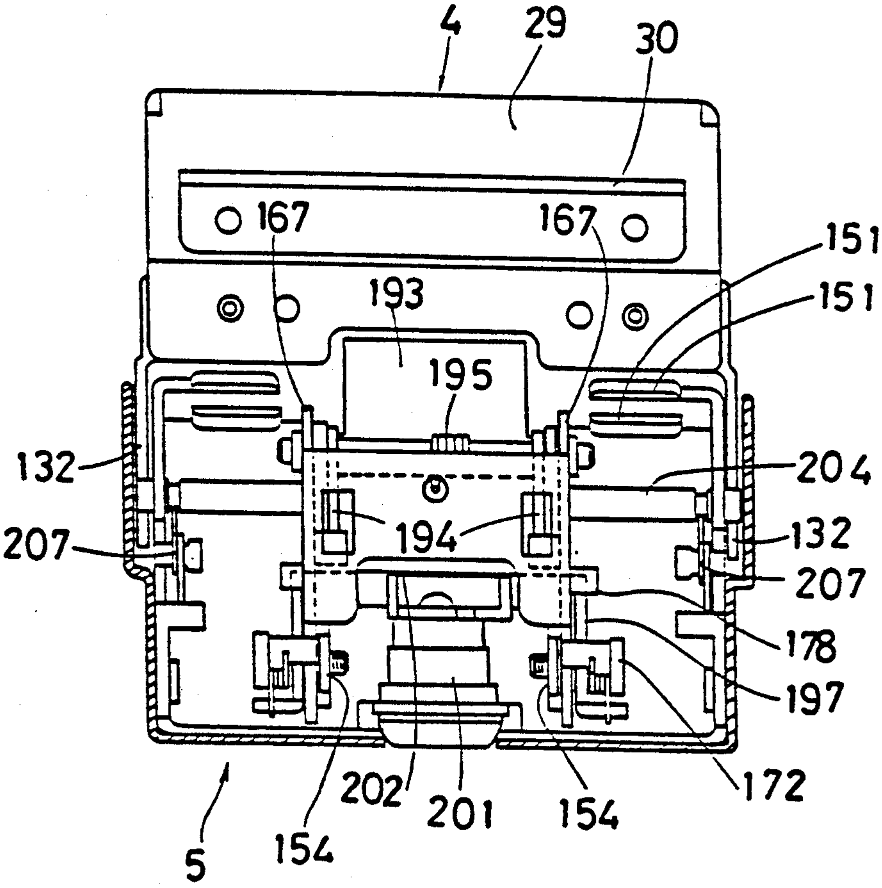
FIG. 14 is a plan view showing the locking means.

The cover plate 16 is a plain rectangular-shaped body. As shown in FIG. 13, the cover plate is inserted between guide pieces 151 erected uprightly from the upper end of the front piece 141 and the front edge of the upper plate 139, whereby the cover plate 16 is inserted along the rear of the front pieces 141, and extends in the lower end thereof across the front edge of the lower plate 140.

Therefore, the cover plate 16 closes the opening 10, and also, comes into contact with the front edge of the lower plate 140, to thereby prevent any opening of the lower plate 140.

As shown in FIGS. 14 to 19, the locking means 17 is provided with a sliding member 162, a stopper means 163, and a releasing means 164. An advancing motion of the sliding member 162 allows its front tip to be engaged with interlocking holes 161, 161 made in the upper end portion of the cover plate 16, thereby making it impossible to pilfer the bank note under the above mentioned closed state of the cover plate 16. The stopper means 163 interlocks said sliding member 162 in the advancing condition thereof to prevent any retreat thereof. The releasing means 164 is turned by using a key K to release the stopper means 163 from the interlocked state.

Figure 15:
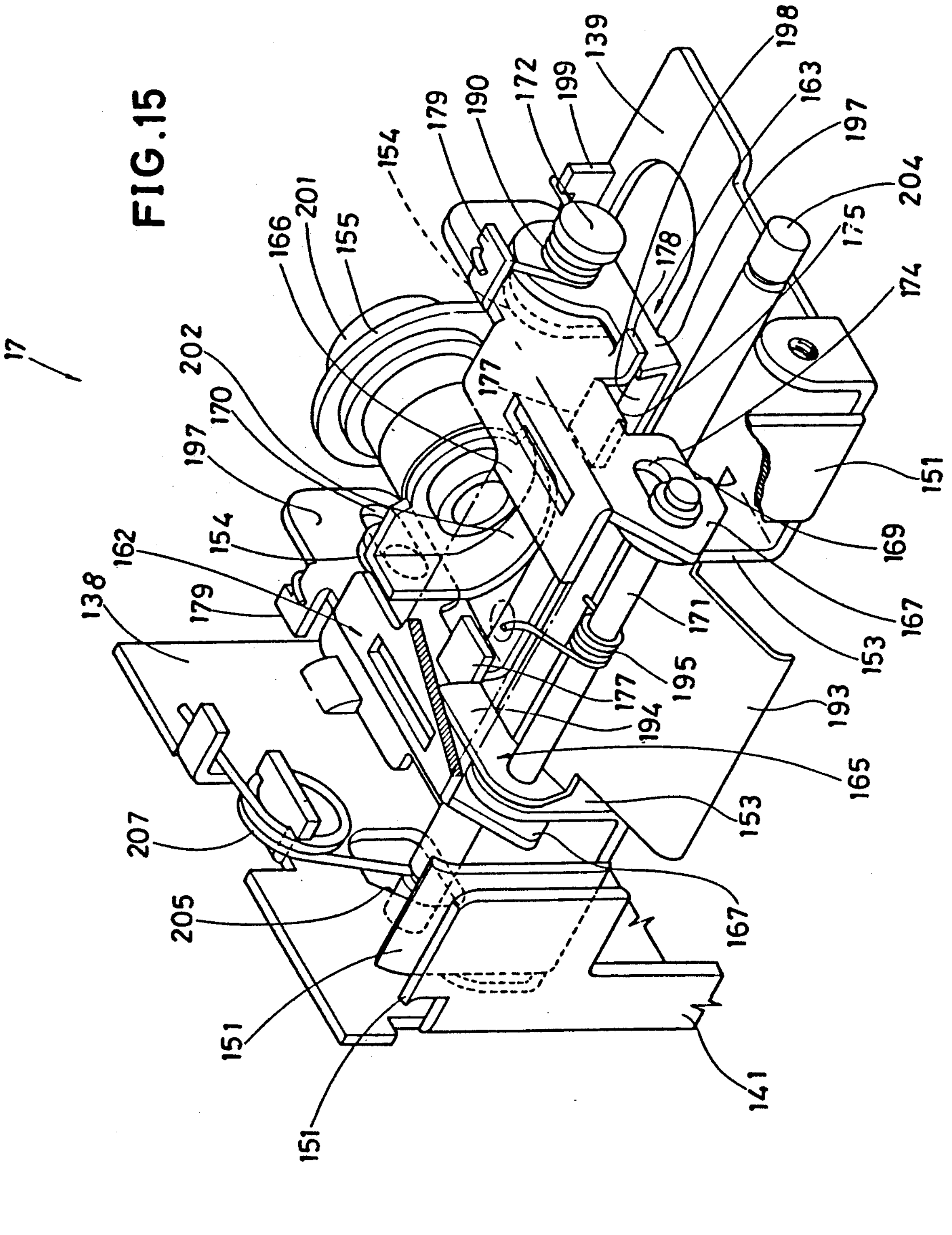
FIG. 15 is a perspective view of the locking means.

The sliding members 162 include a horizontal upper piece 166, and side pieces 167, 167 extending transversely and in parallel with each other, which form a downward angularly C-shaped sectional configuration, as shown in FIG. 15. The front end of the side piece 167 provided with a tapered surface of approximately 90 degrees in opening angle, and fits into the above mentioned interlocking holes 161 of the cover plate 16. Also, the side pieces 167 are provided with elongated holes 169 and 170 in the front end portion and rear end portion thereof.

The above mentioned upper plate 139 is provided with rising pieces 153, 153, 154, 154 in both of the front and rear sides thereof, and these rising pieces are located along the insides of the side pieces 167, 167. The sliding members 162 are slidably attached transverse to the upper plate 139 by using a slide shaft 171 which is stretched between the rising pieces 153, 153 through the elongated holes 169, 169, and a slide pin 172 passing through the elongated hole 170 and fixed in the inside end thereof to the rising piece 154.

Also, the lower edges of the side pieces are respectively provided with a stepped notch which is provided with an interlocking portion 174 formed in a small-height notch, and also with a relief portion 175 formed in a large-height notch, the relief portion 175 located in the rear of and continuously to the interlocking portion 174.

The lower edge of the side piece 167 is provided with an outwardly projecting piece 178 in the rear of the relief portion 175, while at the same time, the upper edge of the relief portion 175 is formed with inwardly protruding pieces 177, 177.

Also, the rear end portion of the upper edge of the side piece 167 is provided with an outwardly protruding spring holder 179, and the spring holder is engaged with an end of a spring 190 attached to the slide pin 172, whereby the sliding members 162 are furnished with frontward force.

The sliding members 162 are also prevented from the advancing motion thereof by using a stopper arm 165.

The stopper arm 165 includes a pressing portion 193 which is freely slantably pivoted between the rising pieces 153, 153 by means of the slide shaft 171 to press the upper end portion of the stack of the printed matter B when the cover plate 16 is inserted. Moreover, the stopper arm 65 is also furnished with arm portions 194, 194 which interlock the protruding pieces 177 of the sliding members 162.

The pressing portion 193 projects in front past the insertion position of the cover plate 16, whereby the pressing portion comes into contact with the cover plate 16, and therefore slants when the cover plate 16 is inserted. As a result, the pressing portion presses the upper end portion of the printed matter B toward the receiving plate 12.

The arm portions 194 rise uprightly on both side edges of the pressing portion 193, and have the slide shaft 171 passed on the front end portion thereof, while at the same time, the arm portions interlock the front edge of the protruding pieces 177 in the rear edge thereof to prevent any advancing movement of the pieces. Also, the insertion of the cover plate 16 causes the rear end thereof to rise, and as a result, the interlocking state is released. The sliding member is therefore allowed to advance.

The stopper arm 165 has the pressing portion 193 thereof furnished with upward force by means of a spring 195 attached to the slide shaft 171.

The abovementioned stopper means 163 includes arm portions 197, 197 disposed outside the side pieces 167 and connected to each other by a jointing piece 198 stretched between the front ends of the lower edges of the arm portions 197, and each arm portion is freely rotatably mounted on the rising piece 154 of the upper plate 139 by means of the slide pins 172. Each arm portion 197 is provided with a spring holder so as to project it so that the spring 190 is interlocked in the other end thereof.

Therefore, the front ends of the arm portions 197 are furnished with upward force by means of the spring 190. Accordingly, on the condition that the sliding member 162 has been returned to a position of retreat, the upper surfaces of the tip portions of the arm portions 197 are brought into contact with the underside of the projecting piece 178. On a condition that the advancing movement of the sliding member 162 causes the rear edge of the projecting piece 178 to advance beyond the tip portion of the arm portion 197, the arm portion 197 is lifted and prevents any retreat of the projecting piece 178.

The releasing means 164 includes a locker body 201 which is fixed on a mounting piece 155 erected uprightly at the rear edge of the upper plate 139 and is provided with a rotary shaft turned by using a key K, and a key cam 202 which is secured to the rotary shaft and depresses the jointing piece 198 of the stopper means 163 through the rotational movement of the rotary shaft.

The locking means 17 includes a locking shaft 204 which cooperates with the sliding member 162 to make it impossible to detach the stacker box 5 when the opening 10 is opened.

The locking shaft 204 is in a round bar configuration, and extends under the interlocking portion 174 between the upper plate 139 and the sliding member 132, and in the upper portions of the interlocking portions 135, both ends of the locking shaft project to both sides of the master box 9 from openings 205, 205 made in the upper end portions of the side plates 138 of the master box 9. Also, the locking shaft 204 is furnished with frontward force by means of a spring 207. The upper portion of the master box 9 is fitted with a cover 209 which masks the locking means 17 together with the protruding portion of both ends of the locking shaft 204.

Therefore, in order to mount the main body 4 with the stacker box 5, the interlocking pins 142, 142 are inserted into the interlocking grooves 134, 134, as described in the foregoing, the master box 9 is tilted in front, and the master box is allowed to be inserted between the hooks 132, 132.

Figure 16:
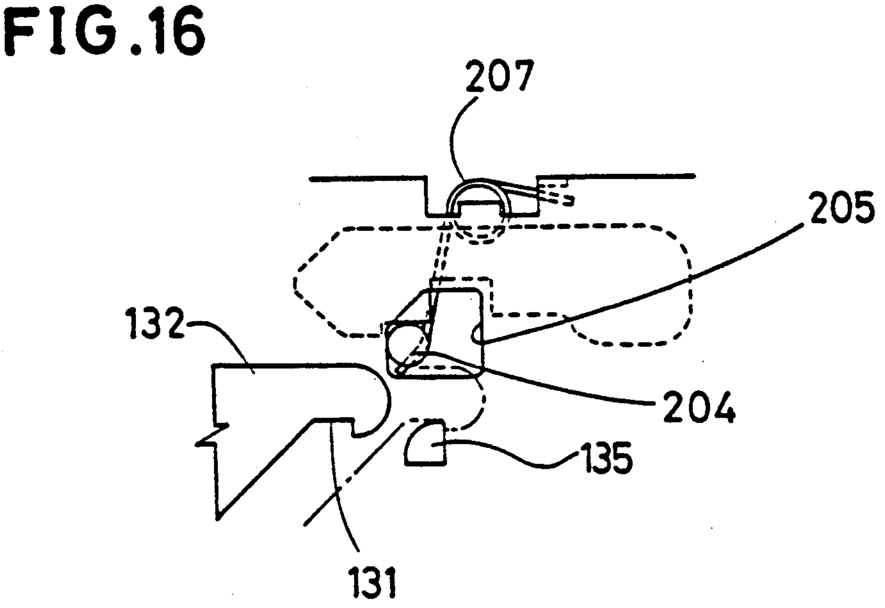
Figure 17:
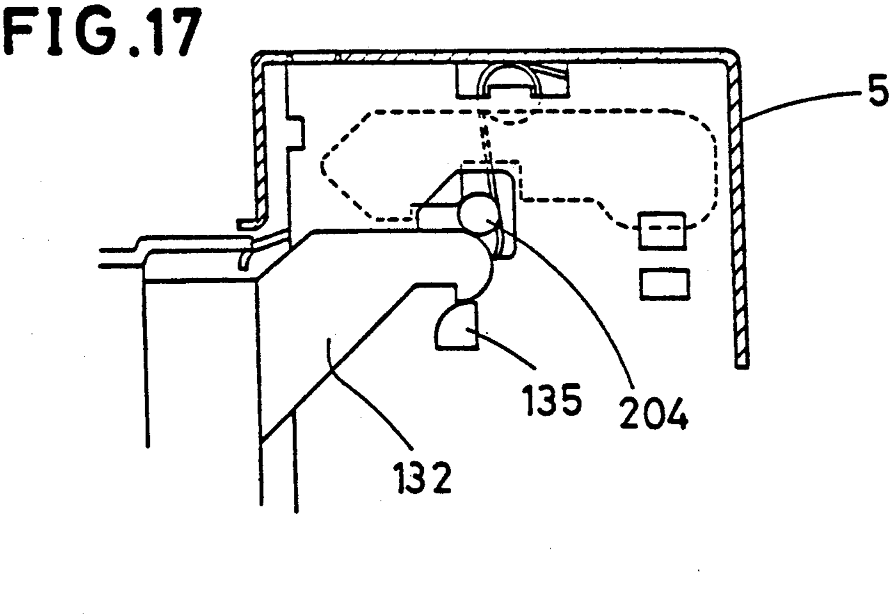

In this case, the locking shaft 204 is furnished with force by means of the spring 207, and as a result, the locking shaft is located in the front end portion of the opening 205, and is in contact with the underside of the interlocking portion 174, as shown in FIG. 16.

Moreover, if the stacker box 5 is further tilted, the locking shaft 204 is forced to the rear end portions of the openings 205 by means of the hook 132.

Subsequently, the hooks 132 and the interlocking portions 135 are engaged with each other, as shown in FIG. 18, and the stacker box 5 is furnished with upward force by means of the receiving piece 133. Consequently, the stacker box 5 rises upwardly. In this condition, the locking shaft 204 is inserted between the hook 132 and the interlocking portion 174 of the sliding member 162 by means of the spring 207.

Thus, the hooks 132 are interlocked between the interlocking portions 135 and the locking shaft 204, thereby causing the stacker box 5 to resist vertical movement and detachment thereof from the main body 4.

In order to detach the stacker box 5, the opening 10 is closed with the cover plate 16.

As shown in FIG. 19, the insertion of the cover plate 16 between the guide pieces 151, 151 causes the stopper arm 165 to tilt, and allows the advance of the sliding members 162 as described in the foregoing. At the same time, the sliding members 162 advance and fit the tip portions thereof into the interlocking holes 161 to make impossible any detachment of the cover plate 16.

On the other hand, the advancing movement of the sliding member 162 causes the relief portion 175 to advance upwardly of the locking shaft 204, and the locking shaft 204 is allowed to move upwardly.

Therefore, the stacker box 5 is depressed against the reaction of the receiving piece 133, whereby the hooks 132 are allowed to force the locking shaft 204 upwardly, and the engagement of the interlocking member 131 with the locking member 135 is released. Consequently, the stacker box 5 can be detached.

Therefore, the stacker box 5 has the opening 10 thereof closed by means of the cover plate 16 at the time of the release of engagement, and any internal printed matter B becomes impossible to see or detach.

Also, in order to take out the internal stack of printed matter B from the stacker box as detached, the key K is inserted into the key hole in the locker body 201, and is turned to rotate the key cam 202 and depress the jointing piece 198. With this sliding member 162 in condition for the retreat thereof, the forced extraction of the cover plate 16 moves the lower edges of the interlocking holes 161 along the tapered surfaces of the side pieces 167, retreats the sliding member 162, and thus allows the cover plate 16 to be extracted as illustrated in FIG. 13.

The removal of the cover plate 16 raises the stopper arm 165 upwardly through the force of the spring 195, and causes the rear ends of the arm portions 194 to interlock the protruding pieces 177, thereby preventing any advancing motion of the sliding member 162. Thus, the opening 10 is opened, while at the same time, the lower plate 140 is allowed to open, whereby the internally received printed matter B can be removed from the opening of the lower surface of the master box 9 while being stacked.

In this embodiment of the invention, the locking means 17 causes the stacker box 5 to be impossible to detach from the main body 4, and also, closes the opening 10 by using the cover plate 16 to thereby allow the stacker box to be detached from the main body.

(G) Description of the Sensor

The sensor scans the printed matter with the transfer thereof, and gives the analog signal which indicates the physical properties of the printed matter B along the scanning route thereof. Also, this sensor in this embodiment includes optical sensors PS1, PS2R, PS3R and PS3L, and also the magnetic sensor SM.

The optical sensors PS1, PS2R and PS2L respectively include a light emitting diode and a phototransistor in pairs which are opposed to each other through the passage 7, and detect the optical transmission factor of the printed matter B.

The optical sensor PS1 is disposed adjacent to the inserting port 15 and on the center line of the passage 7.

The optical sensors PS2R and PS2L are arranged inside the optical sensor PS1 and in their symmetrical positions on opposite sides of the center line of the passage 7.

The magnetic sensor SM includes a pair of magnetoresistance elements, and this sensor and a permanent magnet are molded into an integrated unit relation, while at the same time, the sensor is disposed on the center line inside the optical sensors PS2R and PS2L and over the passage 7, namely, the front side (black side) of a bank note B to detect the magnetic substance of the magnetic printing ink contained on the surface of the printed matter B. The reason for the use of the sensor of the magnetoresistance element type is that this sensor is very high in sensitivity and yet low in resolution, and moreover, the sensor is not so strictly required to come into close contact with the printed matter B, so that the pulse wave-form regeneration therefore is enhanced. If the coil type magnetic head of narrow gap in conventional frequent use is alternatively applied, a plurality of hips in the pulse wave-form are given for the discrimination of the printed matter, and their number and amplitude as given does not remain constant, while on the other hand, the magnetoresistance element type sensor only gives a single hip in the pulse wave form. Therefore, in the use of the coil type magnetic head, the present discriminating apparatus itself become impossible to use. Also, the magnetic head brings about drop-out owing to wrinkles or creases of the printed matter B, and as a result, the apparatus is greatly decreased in the discriminating accuracy thereof, whereas the magnetoresistance element type sensor substantially removes such trouble.

The magnetic sensor SM is provided with a pressing piece 220 thereunder through the passage 7 to press the printed matter B softly thereagainst.

Furthermore, the optical sensors PS3R and PS3L are disposed inside the magnetic sensor MS on their symmetrical positions on opposite sides of the center line.

The optical sensors PS3R and PS3L respectively include a light emitting diode and a photodiode in pairs to detect the optical reflection factor of the reverse side of the printed matter B.

(H) Description of the Means for Generating Timing Signals

A means for generating timing signals is the above mentioned rotary encoder E, and gives timing signals at intervals of time in proportion to the feeding speed of the transferring means 19.

Therefore, the timing-signal generating means produces timing pulses at minute regular intervals corresponding to a position on the surface of the printed matter B or every 0.2 mm in this embodiment of the invention.

(I) Description of the A-D Converter (ADC)

A multichannel, for example, 8-bit A-D converter is applied to the apparatus of the present invention, and converts the analog signal given by the optical sensors PS and the magnetic sensor SM into the digital signals in accordance with the above mentioned timing signals.

(J) Description of the Motor Driving Means

This driving means which drives the transferring motor MC of the transferring means 19 and the stacker motor MS of the forcing means 6 can bring each motor to a stop, to regular rotation, or to reverse rotation upon the control signals given to the input terminal thereof.

(K) Description of Control Means

In the embodiment of the invention, the control means is a one-chip microcomputer including a CPU, ROM, RAM, I/O and the like. This control means is attached to a printed circuit board 212 in the front of the main body 4, and is fitted with a cover 211. Also, the I/O device of the control means has the timing-signal generating means, A-D converter (ADC), motor and driving means, and also a dating means, a recorder 230 and the like connected thereto. This control means includes the following means which are subjected to a time-sharing operation by using programs written in the read-only memory. Each or some of these means can be formed as separate components.

* Means for Detecting the Insertion of Printed Matter

This means for detecting the insertion of the printed matter monitors the output of the optical sensor PS1 through the A-D converter while it stands by for the insertion of the printed matter B, and detects the insertion of the printed matter B from a decrease in the optical transmission factor. Also, this means for detecting subjects the transferring means 19 to regular rotation through the motor driving means when it has detected the insertion of the printed matter B.

Thus, the internally inserted printed matter B is introduced into the passage 7.

* Tilt Detecting Means

When the means for detecting the insertion of the printed matter sets the transferring means 19 in motion, a tilt detecting means detects the passing of the front edge of the printed matter B while monitoring each output of the optical sensors PS2R and PS2L through the analog-digital converter. Moreover, this tilt detecting means calculates the difference in passing time of the printed matter B between the optical sensors PS2R and PS2L. If this difference in passing time is more than predetermined, the tilt detecting means judges that the printed matter B tilts, and operates the transferring means 19 reversely through the motor driving means.

Therefore, any printed matter B inserted at a slant in the apparatus is rejected and returned from the inserting port 15.

* Noise Detecting Means

The noise detecting means detects and memorizes any noises of the analog signal system, which processes the analog signal of each sensor, before each sensor gives the signal after the printed matter B has been inserted.

* Means for Giving Trigger Signal

A means for giving a trigger signal monitors the output of the magnetic sensor SM through the A-D converter, and gives a trigger signal when it detects the above mentioned reference position which consists of the front end of the pattern printed on the printed matter B by using magnetic ink, namely, in this embodiment, one of the edging lines printed on the peripheral portions of the U.S. dollar note.

Such setting of the reference position is to prevent any decrease in the discriminating accuracy of the apparatus which can be caused by a shear in the printing of the bank note.

* Sampling Means

The sampling means is triggered by means of the trigger signal and begins sampling the analog outputs of the optical sensors PS1, PS2R and PS2L and also that of the magnetic sensor SM through the A-D converter in accordance with the timing pulses of the timing-signal generating means.

* Noise Removing Means

A noise removing means subtracts the noise portion from the data sampled by means of the sampling means, and at the same time, allows a means for memorizing sampled data to store them.

* Means for Memorizing Sampled Data

The means for memorizing sampled data includes the above mentioned semiconductor RAM, and stores a series of noise-free magnetic sampled data obtained by scanning the middle portion of the printed matter B magnetically and a series of optical sampled data of three pairs obtained also by scanning the optical transmission factor in the middle portion of the printed matter B and symmetrical positions opposed thereof which are opposed therethrough.

* Means for Checking Optical Transmission Factor

A means for checking the optical transmission factor checks if the base level of the optical transmission factor of the printed matter which has been detected by means of the optical sensors PS1, PS2R and PS2L is within predetermined limit. If the base level is outside the limit, this means reversely rotates the transferring means 19 to reject the printed matter B.

Therefore, it will be understood that bank notes which are small in their optical transmission factor, such as two or more overlapped or layered bank notes or stained old bank notes and any bank notes of a large optical transmission factor such as counterfeit bank notes which are, for example, copied only on their single sides are both rejected.

* Means for Detection of Transferring Timing

A means for the detection of the transferring timing counts the timing pulse of the means for generating timing signals to thereby detect the passing time of the front end of the printed matter B between the optical sensors PS2R and PS2L and the optical sensors PS3R and PS3L. If the passing time of the end is discovered to be later than specified, the transferring means 19 is reversely rotated to reject the printed matter.

This achieves the rejection of any exhausted bank notes and the prevention of any jamming trouble of bank notes.

* Length Detecting Means

The length detecting means is triggered by means of the above mentioned trigger signal, and counts the timing pulse until the rear end of the printed matter B has passed the optical sensors PS2R and PS2L. If the counted value of the timing pulse is outside predetermined allowable limit, the length detecting means rotates the transferring means 19 reversely to reject the bank note.

As a result, rejection is achieved for any bank notes cut to any small length and any bank notes of two thicknesses which are increased in their apparent length.

* Means for Memorizing Reference

A means for memorizing a reference includes the above mentioned semiconductor ROM, and beforehand keeps in memory a reference R with which the sampled data within the sampled-data memorizing means is to be compared.

Figure 20:
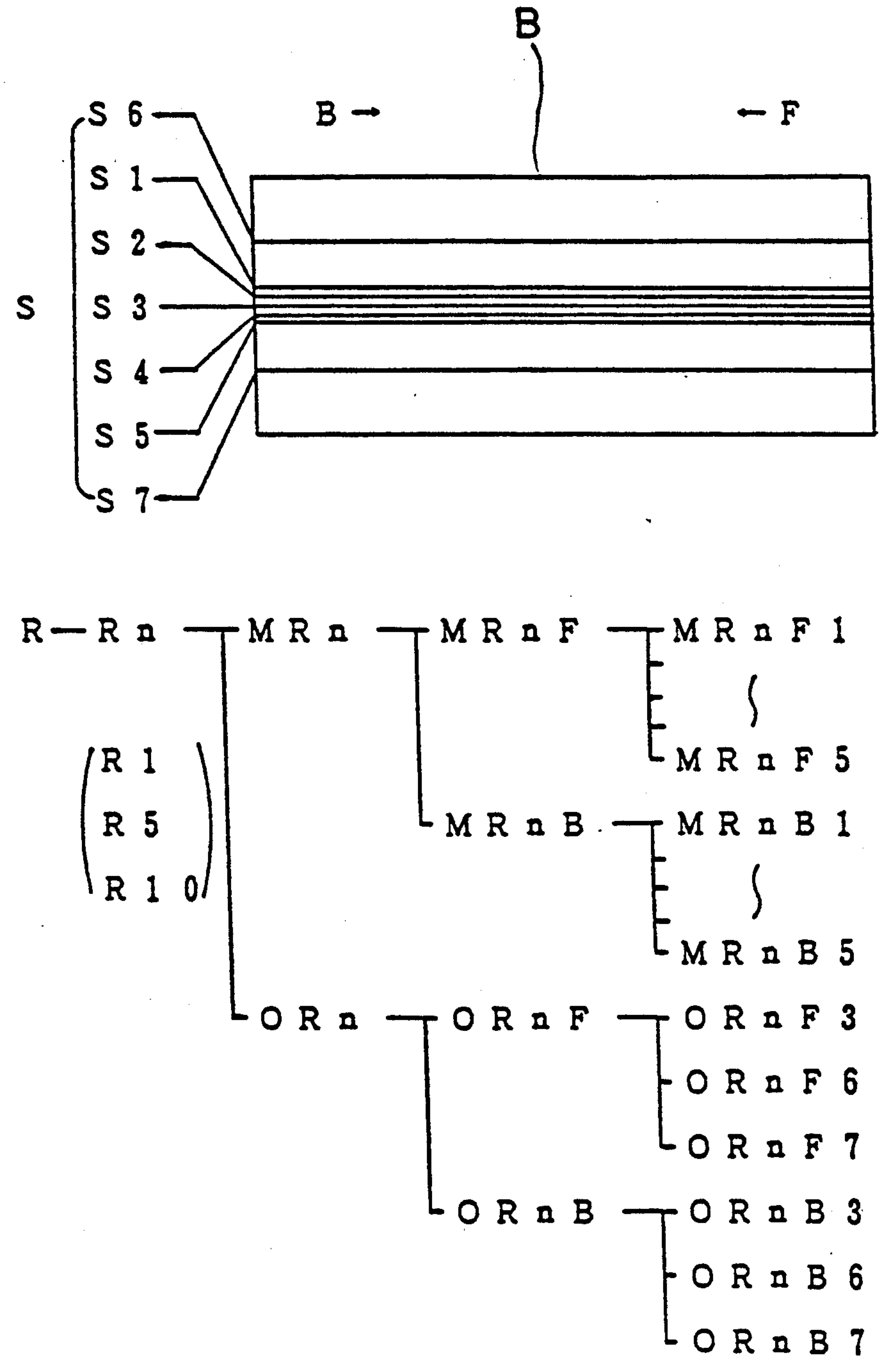
FIG. 20 is a diagram explaining the scanning route and the reference data R.

As shown in FIG. 20, the reference R includes plural references Rn (n=1, 5, 10) for each denomination of bank notes (1 U.S. Dollar, 5 U.S. Dollar and 10 U.S. Dollar in this embodiment).

Each reference Rn includes a reference MRn for the magnetically sampled data, and a reference ORn for the optically sampled data.

Moreover, the reference MRn includes a reference MRnF and a reference MRnB for scanning from the front direction (F) and the rear direction (B) of the printed matter B, respectively, and similarly the reference ORn includes a reference ORnF and a reference ORnB, thereby allowing the bank note B to be discriminated in the authenticity and denomination thereof regardless of an orientation of the printed matter B.

Also, the references MRnF and MRnB respectively include references MRnF1 to MRnF5 and references MRnB1 to MRnB5 for the scanning routes S1 to S5.

The number of the references for a single denomination of the bank note is set from 10 to 20, preferably an odd number for example 15. That is, in this embodiment, the number of the references such as (MRnF1 to MRnF5) or (MRnB1 to MRnB5) included in the reference MRnF or MRnB are respectively set to for example 15 to 16, but in totally an odd number.

The reason for such setting of the number of the reference is that a shear in the printing of the bank note and any irregularity in the shading or the like thereof cause the wave-form of the signal to fluctuate so greatly that a single reference for a single scanning route can occasionally not cover the fluctuations of the waveform of the signal, and therefore, a plurality of references are required to be alloted to a single scanning route.

Likewise, the references ORnF and ORnB respectively include references ORnF3, ORnF6, ORnF7 and references ORnB3, ORnB6, ORnB7 for the scanning routes S3, S6 and S7.

Figure 23A:
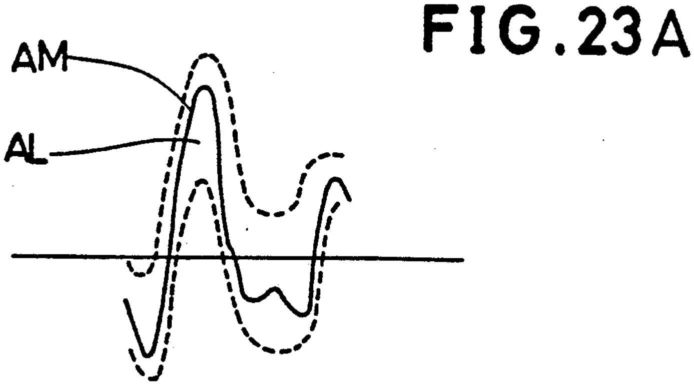
FIGS. 23A to 23C are diagrams explaining the reference data.
Figure 23B:
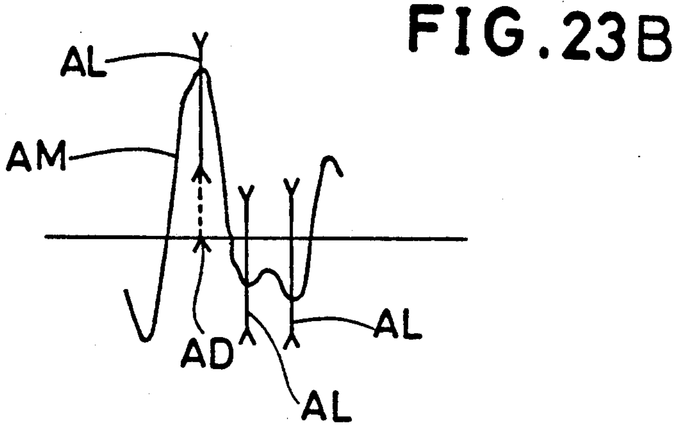
Figure 23C:
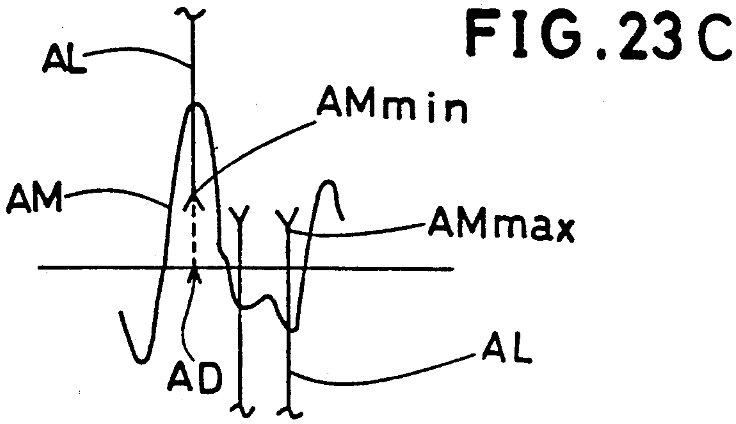

As shown in FIGS. 23A to 23C, each reference includes a plurality of reference data showing the allowable limits AL of the amplitudes AM of the analog signal obtained by scanning from the front direction (F) or rear direction (B) of the bank note of one kind along one of the scanning routes S extending longitudinally of the bank note.

Moreover, although the above mentioned reference data included in single reference may be of the same sampling rate as the above mentioned sampled data as far as the storage capacity permits, they are preferably decreased in conformity with outstanding and characteristic points of the analog signal, as diagrammed in FIGS. 23B and 23C to improve the storing efficiency.

In this embodiment therefore, each reference includes the reference data and the corresponding address data in pairs, wherein each reference data shows the allowable limit AL of the amplitude AM in the outstanding and characteristic point such as a hip or dip center, and the address data shows the address AD of the above mentioned point, which is based on the reference position. Moreover, the allowable limit AL for the hip center is a minimum allowable value AMmin of the amplitude, and that for the dip center is a maximum allowable value AMmax. In this case therefore, the storage capacity can be greatly reduced. It could be confirmed that such a reduction in the data included in a single reference data scarcely affects the discriminating accuracy of the present apparatus.

As diagrammed in FIG. 20, the above mentioned scanning routes S includes the route S3 set on the center line of the bank note, the routes S1, S2, S4, S5 located on both sides of the route S3 with minute spacings between,every two ones of the latter routes, and the routes S6 and S7 arranged on both side symmetrical positions of the center line with relatively large spacings from the routes S1 and S5.

Each reference data is addressed based on, as the above mentioned reference position, the front edge of the printed pattern of the printed matter in the scanning direction F or B.

* 1st Comparing Means

A series of magnetically sampled data in the sampled-data memorizing means is successively compared with the references MRn (as mentioned above and summarized below, in this example, 30 in kind but approximately 45 to 50 in number) for each denomination of the bank note to carry out an operation for checking coincidence or noncoincidence therebetween.

MR1F1 to MR1F5
MR1B1 to MR1B5
MR5F1 to MR5F5
MR5B1 to MR5B5
MR10F1 to MR10F5
MR10B1 to MR10B5

If a series of magnetically sampled data is found to be within the above mentioned allowable limits of the reference, they are judged to coincide with each other.

The comparison is repeated a number of times, for example, 17 times for each reference (such as MR1F1), and the addresses of the reference data or a series of magnetic sampled data are singly shifted relatively each time the comparison is conducted. That is to say, each reference data and a series of magnetic sampled data are compared with each other, with their respective reference positions in correspondence therebetween, and with their respective reference positions transversely spaced apart relatively at minute regular intervals (by 0.2 mm on the bank notes in this embodiment).

If the reference data of the reference (MR1F1) and a series of magnetic sampled data coincide with each other in the scanning directions and also in the denominations of the bank notes, a plurality of correspondences (more than three correspondences) therebetween takes place, at the condition their reference positions are in coincidence therebetween and in addition, at the conditions one of the reference positions is shifted immediately from one side to the other, as apparent from the FIG. 23C.

* 1st Judging Means

This means determines which reference has the greatest number of correspondences due to the plural shifts in the above mentioned comparisons of the reference data of each reference and a series of magnetic sampled data by the first comparing means, and if the greatest number is more than, for example, 5 to 6, the means judges that a series of the sampled data is in coincidence with the reference group (MR1) of the reference (MR1F1) with which the sampled data has formed the greatest number of coincidences. Also, if the greatest number of coincidences is discovered to be less than specified, the means reversely rotates the transferring means 19 to reject the printed matter B.

* 2nd Comparing Means

The second comparing means compares the optically sampled data with the reference data of each reference ORn for each denomination of bank note while shifting the addresses as the first comparing means, to thereby perform an operation for checking coincidence or non-coincidence therebetween.

* 2nd Judging Means

The second judging means detects the greatest number of coincidences in the comparisons of the optically sampled data with the reference data of the reference ORn for the denominations of the bank notes as the first judging means.

* 3rd Judging Means

A third judging means detects if the results judged by the first and second judging means consistently coincide with each other. If the consistent coincidence therebetween is detected, the third judging means judges the bank note B of such coincidence to be a valid note, and furnishes the vending machine through the interface with the signal which indicates the denomination of the bank note.

Moreover, the third judging means uses the coincidental combination between the optical sampled data and the reference data ORnF6, ORnF7, ORnB6 and ORnB7 in the scanning direction determined by the first judging means, to detect if the bank note B as inserted is upward in the front side thereof. If the third judging means discovers the bank note B is facing downward in the front side thereof, the means rotates the transferring means 9 reversely to reject the bank note B.

* Operation Controlling Means

If an operation controlling means receives the signal for the continuation of the operation from the vending machine through the interface after the third judging means has given the signal which indicates the denomination of the bank note, the operation controlling means subjects the transferring means 19 to a regular operation, thereby allowing the rear end of the bank note B to pass the above mentioned lever 221 inwardly.

On the contrary, if the operation controlling means receives the signal for the cancellation of the operation from the vending machine through the interface, this controlling means reversely rotates the transferring means 19 to reject the bank note B which has been subjected to discrimination, and is at a stop, with the rear end thereof before the lever 221.

Moreover, if the operation controlling means stands by for the insertion of the printed matter into the inserting port 15, and in this condition, receives the signals for the inhibition of the acceptance of the printed matter, this controlling means inhibits the above mentioned accepting operation of the printed matter.

* Means to Bring the printed Matter to a Stop in a Fixed Position

A means to bring the printed matter to a stop in a fixed position monitors the output of the optical sensors PS3R and PS3L through the analog-digital converter, and detects that the rear end of the printed matter B has passed these optical sensors. Upon this detection, this means counts the timing pulses generated by means of the timing signal generating means, and brings the operation of the transferring means 19 to a stop if the counted pulse value reaches a predetermined value.

Therefore, the printed matter B comes to a stop in the predetermined position thereof.

* Stacker Operating Means

If the transferring means 19 is brought to a stop by the preceding means for bringing the printed matter to a stop, a stacker operating means regularly rotates the stacker motor MS for forwarding the forcing means 6, and at the same time, starts up the timer.

Therefore, the printed matter B is stacked in the stacker box 5.

* 1st Means for Detecting the Full Condition of the Stacker Box

The first means for detecting the full condition of the stacker box checks time counted by means of the timer, and if the forcing plate 13 does not return to the fixed position thereof, this first means recognizes the stacker box 5 to be filled with the printed matter, and furnishes the vending machine through the interface with a signal indicating that the stacker box 5 is full of the printed matter.

* 2nd Means for Detecting the Full Condition of the Stacker Box

The second means for detecting the full condition of the stacker box totals the number of the printed matter B stacked in the stacker box 5, and gives the same signal as the preceding first means if the total number of the printed matter B reaches a predetermined value.

* Summing Means

A summing means sums up the number of the bank notes B stacked within the stacker box 5, and their values at regular intervals of, for example, one hour on the basis of the time signals given by means of the dating means connected to the above mentioned I/O, and records the summed data daily in the above mentioned RAM.

* Recording Means

If a storage medium 231 is provided in a port on the lower rear of the main body 4, a recording means records in the medium 231 the above mentioned data recorded in the RAM and an identification number such as a serial number separately given for different discriminating apparatus. This ID number can be stored in advance the above mentioned ROM. An alternative arrangement can be made in which a setting switch such as an external DIP switch is used to set the registration number.

The storage medium 231 is what is called an IC card in this embodiment, and the above mentioned recorder 230 is an IC card writer which has the IC card mounted therewith, and is provided on the rear side of the main body 4. This IC card may incorporate EEP-ROM or S-RAM and a memory holding battery.

Also, the recorder may be a floppy disk device, a magnetic card device, a RAM board or the like.

The bank notes stacked in the stacker box are removed for collection from the apparatus together with the stacker box, and thereafter, a new stacker box 5 is attached. A detector means 232 provided on a side of the main body 4 detects the reattachment of the stacker box, thereby achieving the clearance of the above mentioned data recorded in the RAM.

A method for recording a variety of data in the storage medium 231 will not be described.

In general, a standardized code such as the JIS code, ASCII or the like is used to record letters, numerals and the like. This allows any recorded data to be easily read or to be readily modified. In this embodiment of the invention, therefore, in order to prevent such a disadvantage, each data is recorded after it has been subjected to conversion by using a fixed reverse-convertible expression on the basis of a table of random numbers and the above mentioned registration which are both recorded in advance in the above mentioned storage medium. As a result, it is substantially impossible to read and modify any memorized data, and any possibility of illegality such as pilferage of the internal bank notes from the apparatus can be removed.

Recording formats or memory allocation of the storage medium 231 will next be described with reference to FIGS. 21 and 22.

Figure 21:
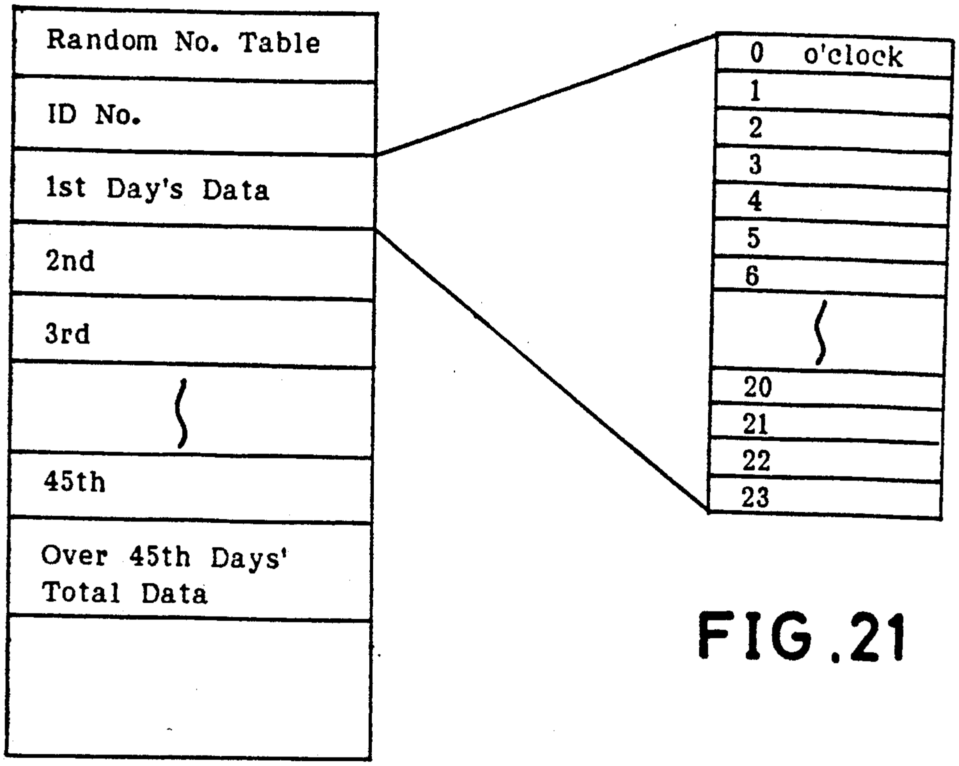
FIGS. 21 and 22 are diagrams showing examples of the memory allocation of the storage medium.

FIG. 21 shows an example of a format in which the storage location is fixed. In this format, addressing is facilitated, while on the other hand, some capacity is left of no use if the recording of data is limited to some zone of time.

Figure 22:
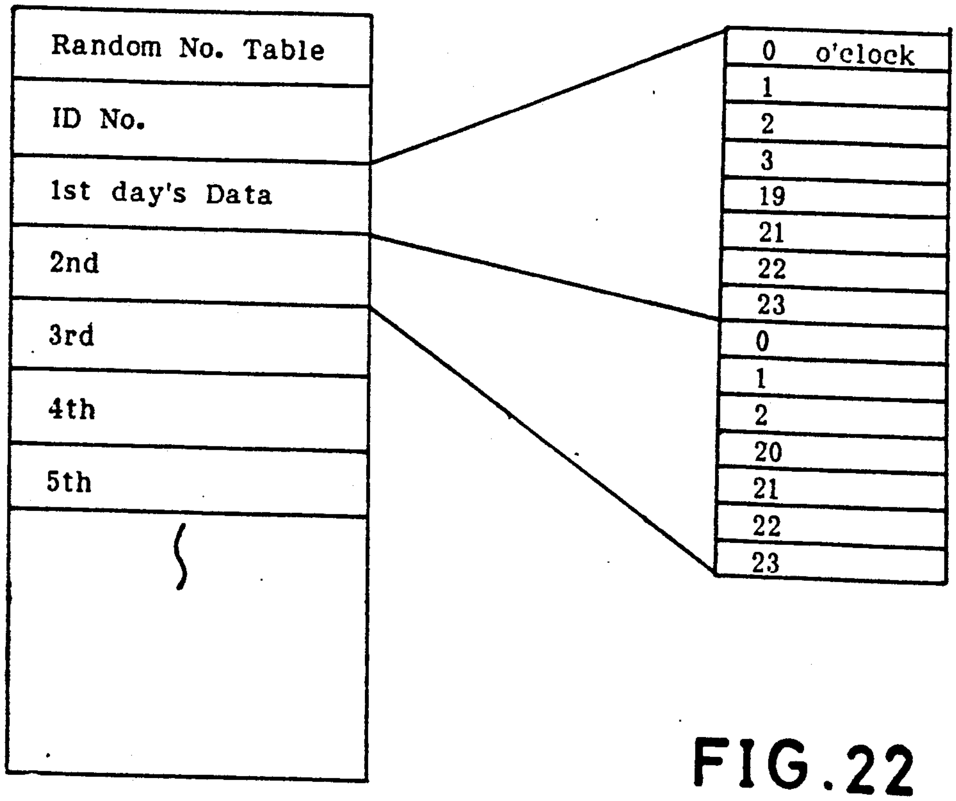

FIG. 22 shows an example of format in which the storage location is allowed to change. In this format, only when any recording data is required to be recorded, the data including corresponding time data is recorded in pairs.

Therefore, the collector of the bank notes contained in this apparatus brings to the apparatus the storage medium 231 in which a table of random numbers are written, and mounts the apparatus with this storage medium. Thus, the data contained in the RAM is automatically transferred to the storage medium. The storage medium 231 is retrieved together with the bank notes B to read any recorded data therefrom by means of a computer for the control of the data and bank notes so that, for example, clerical accounting works are feasible. This can check any illegal pilferage of the bank notes at the time of retrieval.

As described hereinbefore, the discriminating apparatus for printed matter according to the present invention is provided with the transferring means, the sensor means which reads the discriminating pattern of the printed matter and produces analog signals, the timing means which generates periodical timing signals in proportion to the feeding speed of the above mentioned transferring means, the A-D converter which samples the above mentioned analog signal in accordance with the timing signals, and produces a series of digital sampled data each of which informs the amplitude of the analog signal, the reference-data memorizing means which keeps in memory the reference indicating the allowable limits of the above mentioned amplitude, and the control means which shifts the above mentioned reference data relative to a series of digital sampled data so that the reference data and the sampled data correspond in their address base and are shifted with each other, and also which checks if the sampled data are within the allowable limits. For this reason, the apparatus of the present invention removes the information of irregularity in the feeding speed of the transferring means in advance of the sampled data, and moreover, can effectively use the characteristic particulars of the amplitude for the discriminating operation thereof. Also, even if the printed matter undergoes any displacement in the feeding direction or in the transverse direction or any other displacement which can be caused by, for example, a slant thereof in the passage, the discriminating apparatus of the present invention shifts the reference positions of the data to prevent any risk that such displacement affects the discriminating operation. As a result, the discriminating apparatus of the present invention achieves a much more accurate discrimination of the printed matter. This is a great advantageous effect of the apparatus of the present invention, and it will be understood that this apparatus is furnished with other advantages.

I claim:

1. An apparatus for discriminating printed matter having a discriminating pattern thereon, comprising:

a passage with an inserting port for the printed matter;

transferring means for transferring the printed matter inserted in said inserting port;

sensor means including at least one sensor for scanning the printed matter while transferring and producing an analog signal corresponding to the discriminating pattern thereof;

timing means for generating periodic timing signals of predefined intervals, said intervals being in proportion to the transferring speed of the transferring means so that the timing signals correspond to regular short intervals on the printed matter;

trigger means for monitoring the output of said sensor means to detect a predetermined reference point on the printed matter and generating a trigger signal when detected;

digital sampling means triggered by said trigger signal to start sampling the analog signal at the intervals of said timing signals to produce a series of digital sampled data, said series of digital sampled data each designating the amplitude of the analog signal at an address based on said reference point;

reference data memorizing means stored therein with a reference comprising a plurality of reference data to be compared with said series of digital sampled data, said plurality of reference data each showing an allowable limit for the amplitude of the analog signal at a predetermined address based on said reference point, wherein said reference includes a plurality of references per one kind of printed matter, for a plurality of different scanning routes including a route on the center line of the printed matter, and routes located on both sides of said center line with minute spacings therebetween; and control means including data comparing means for comparing the sampled data with the reference data, address shifting means for shifting the addresses of the reference data relative to the addresses of the sampled data to make a plurality of conditions in the comparison made by said data comparing means, and judging means for determining from results of the comparison whether the sampled data coincide with the reference, said conditions including at least the following conditions:

a condition in which the addresses of the reference data substantially coincide with the addresses of the sampled data in terms of said reference points;

a condition in which the addresses of the reference data are shifted from the addresses of the sampled data by increasing the addresses of the reference data relative to the addresses of the sampled data; and a condition in which the addresses of the reference data are shifted from the addresses of the sampled data by decreasing the addresses of the reference data relative to the addresses of the sampled data, said comparing means comparing, in each condition, the reference datum at each of the addresses with the sampled datum at the corresponding address to determine whether the amplitude is within the allowable limit, in each condition, when the amplitudes designated by the compared sampled data are within the limits shown by the compared reference data, said judging means judging that the sampled data collectively coincide with the reference data in that condition, when the number of the coincidence between the sampled data and the reference data through the comparisons in said conditions is more than a predetermined number, said judging means judging that the sampled data wholly coincide with said reference, and outputting a signal indicating that the inserted printed matter is acceptable.

2. The apparatus of claim 1, wherein said control means further include noise removing means which memorize a noise generated by an analog signal system which processes the analog signal of the at least one sensor, before the at least one sensor generates the signal after the printed matter has been inserted, and subtracts the memorized noise from the digital data converted from the analog signal to produce said sampled data including no noise.

3. The apparatus of claim 2, wherein the at least one sensor of said sensor means is a magnetic sensor disposed on the center line of the passage, and said sensor means further include a pair of optical sensors disposed symmetrically with respect to said center line, and said control means further include tilt detecting means which monitor each output of the pair of optical sensors to detect the passing of the front edge of the transferred printed matter, and calculate a difference in passing time of the front edge of the printed matter between the pair of optical sensors, and compare the difference with a predetermined time, and operate the transferring means reversely to reject the printed matter when the difference is greater than the predetermined time.

4. The apparatus of claim 2, wherein said printed matter is a U.S. currency note, and said reference point is the hem line printed on the U.S. currency note in magnetic ink.

5. The apparatus of claim 1, wherein the at least one sensor of said sensor means is a magnetic sensor disposed on the center line of the passage, and said sensor means further include a pair of optical sensors disposed symmetrically with respect to said center line, and said control means further include tilt detecting means which monitor each output of the pair of optical sensors to detect the passing of the front edge of the transferred printed matter, and calculate a difference in passing time of the front edge of the printed matter between the pair of optical sensors, and compare the difference with a predetermined time, and operate the transferring means reversely to reject the printed matter when the difference is greater than the predetermined time.

6. The apparatus of claim 5, wherein said printed matter is a U.S. currency note, and said reference point is the hem line printed on the U.S. currency note in magnetic ink.

7. The apparatus of claim 1, wherein said printed matter is a U.S. currency note, and said reference point is the hem line printed on the U.S. currency note in magnetic ink.

* * * * *